United States Patent [19]
Hotta et al.

[11] Patent Number: 6,032,229
[45] Date of Patent: *Feb. 29, 2000

[54] SEMICONDUCTOR MEMORY DEVICE AND INFORMATION PROCESSOR USING THE SAME

[75] Inventors: Takashi Hotta, Hitachi; Hideo Sawamoto, Machida; Noboru Akiyama, Hitachinaka; Takashi Akioka, Akishima; Shigeya Tanaka, Hitachi, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/562,187

[22] Filed: Nov. 22, 1995

[30] Foreign Application Priority Data

Nov. 30, 1994 [JP] Japan .................................. 6-296215

[51] Int. Cl.$^7$ .............................. G06F 12/08; G06F 13/00
[52] U.S. Cl. .......................... 711/137; 711/122; 711/144; 711/145; 711/168; 712/32
[58] Field of Search .................... 395/445, 403, 395/250, 449, 495, 415, 872, 459, 309–310, 800.32, 800.38; 711/117–118, 122, 137–138, 144–145, 167–168, 210; 710/129–130, 52; 712/32, 38, 207, 237

[56] References Cited

U.S. PATENT DOCUMENTS

| | | | |
|---|---|---|---|
| 4,354,232 | 10/1982 | Ryan ....................................... | 711/118 |
| 4,467,414 | 8/1984 | Akagi et al. .............................. | 711/119 |
| 4,823,259 | 4/1989 | Aichelmann, Jr. et al. ............ | 711/122 |
| 5,023,776 | 6/1991 | Gregor ..................................... | 711/122 |
| 5,202,972 | 4/1993 | Gusefski .................................. | 711/123 |
| 5,224,214 | 6/1993 | Rosich .................................... | 395/250 |
| 5,261,074 | 11/1993 | Solomon et al. ....................... | 710/100 |
| 5,418,973 | 5/1995 | Ellis et al. .............................. | 395/800 |
| 5,471,598 | 11/1995 | Quattromani et al. .................. | 395/449 |
| 5,524,220 | 6/1996 | Verma et al. ............................ | 395/375 |
| 5,579,526 | 11/1996 | Watt ........................................ | 395/800 |
| 5,828,860 | 10/1993 | Miyaoku et al. ....................... | 395/383 |

OTHER PUBLICATIONS

Intel, Cache Tutorial, 1991, 1–3 –1–4.

*Primary Examiner*—John W. Cabeca
*Assistant Examiner*—Denise Tran
*Attorney, Agent, or Firm*—Antonelli, Terry, Stout & Kraus, LLP

[57] ABSTRACT

An information processor having a high performance as a whole is provided by improving the throughput of the processor and the semiconductor memory device. The information processor comprises a memory having a buffer for temporarily holding data and a processor having a memory interface part for controlling the memory to transfer data to the buffer before determining whether the data is to be written in the memory and to write the data in said memory after determining of writing. Data writing and reading to the semiconductor device is pipelined by justifying data exchange between reading and writing. Since the data transfer timings of reading from a memory and writing in the memory can be executed at the same time, the reading process and the writing process can be performed by pipeline-like process and the throughput can be improved.

9 Claims, 33 Drawing Sheets

ADR···ADDRESS TRANSFER CYCLE FROM PROCESSOR TO RAM
RAM···ACCESS CYCLE TO RAM
DAT···DATA TRANSFER CYCLE BETWEEN RAM AND PROCESSOR
HIT···HIT CHECK CYCLE
WRT···WRITE DETERMINE CYCLE

FIG. 11

| LTW PROCESS REQUEST | BT PROCESS REQUEST | W PROCESS REQUEST | IS PRECEDING CYCLE LTW OR W PROCESS TO THE SAME LINE ? | "IS PRECEDING CYCLE LTW PROCESS TO THE SAME LINE ?" OR "IS PRECEDING CYCLE W PROCESS TO THE SAME LINE AS THE LINE DURING LT ?" | PROCESS |
|---|---|---|---|---|---|
| 1 | * | * | * | * | LTW |
| 0 | 1 | * | YES | * | IDLE |
| 0 | 1 | * | NO | * | BT |
| 0 | 0 | 1 | * | YES | IDLE |
| 0 | 0 | 1 | * | NO | W |

FIG. 13

| LTW PROCESS REQUEST | BT PROCESS REQUEST | W PROCESS REQUEST | IS PRECEDING CYCLE LTW PROCESS TO THE SAME LINE ? OR IS PRECEDING CYCLE W PROCESS TO THE SAME LINE AS THE LINE DURING LT ? | IS PRECEDING CYCLE COPY-OUT (CO) PROCESS? | PROCESS |
|---|---|---|---|---|---|
| * | * | * | * | YES | LTW |
| 1 | * | * | YES | NO | IDLE |
| 1 | * | * | NO | NO | CO |
| 0 | 1 | * | YES | NO | IDLE |
| 0 | 1 | * | NO | NO | BT |
| 0 | 0 | 1 | PRECEDING CYCLE IS LTW PROCESS TO THE SAME LINE. | NO | IDLE |
| 0 | 0 | 1 | PRECEDING CYCLE IS NOT LTW PROCESS TO THE SAME LINE. | NO | W |

FIG. 18

| | INPUT | | | | | OUTPUT | | | | | |
|---|---|---|---|---|---|---|---|---|---|---|---|
| | FIRST WRT BUFFER ENABLE SIGNAL | SECOND WRT BUFFER ENABLE SIGNAL | THIRD WRT BUFFER ENABLE SIGNAL | RAM WRITE SIGNAL | WRITE DETERMINE SIGNAL | FIRST WRT BUFFER SET SIGNAL | SECOND WRT BUFFER SET SIGNAL | THIRD WRT BUFFER SET SIGNAL | FIRST WRT BUFFER SELECT SIGNAL | SECOND WRT BUFFER SELECT SIGNAL | THIRD WRT BUFFER SELECT SIGNAL |
| | 1516 | 1517 | 1518 | 1343 | 1514 | 1331 | 1332 | 1333 | 1334 | 1335 | 1336 |
| 1 | 0 | 0 | 0 | 0 | 0 | 0 | 0 | 0 | 0 | 0 | 0 |
| 2 | 0 | 0 | 0 | 0 | 1 | 1 | 0 | 0 | 0 | 0 | 0 |
| 3 | 0 | 0 | 0 | 1 | 0 | — | — | — | — | — | — |
| 4 | 0 | 0 | 0 | 1 | 1 | — | — | — | — | — | — |
| 5 | 0 | 0 | 1 | 0 | 0 | 0 | 0 | 0 | 0 | 0 | 1 |
| 6 | 0 | 0 | 1 | 0 | 1 | 1 | 0 | 0 | 0 | 0 | 1 |
| 7 | 0 | 0 | 1 | 1 | 0 | 0 | 0 | 1 | 0 | 0 | 1 |
| 8 | 0 | 0 | 1 | 1 | 1 | 1 | 0 | 1 | 0 | 0 | 1 |
| 9 | 0 | 1 | 0 | 0 | 0 | 0 | 0 | 0 | 0 | 1 | 0 |
| 10 | 0 | 1 | 0 | 0 | 1 | 1 | 0 | 0 | 0 | 1 | 0 |
| 11 | 0 | 1 | 0 | 1 | 0 | 0 | 1 | 0 | 0 | 1 | 0 |
| 12 | 0 | 1 | 0 | 1 | 1 | 1 | 1 | 0 | 0 | 1 | 0 |
| 13 | 0 | 1 | 1 | 0 | 0 | 0 | 0 | 0 | 0 | 0 | 1 |
| 14 | 0 | 1 | 1 | 0 | 1 | 1 | 0 | 0 | 0 | 0 | 1 |
| 15 | 0 | 1 | 1 | 1 | 0 | 0 | 1 | 1 | 0 | 0 | 1 |
| 16 | 0 | 1 | 1 | 1 | 1 | 1 | 1 | 1 | 0 | 0 | 1 |
| 17 | 1 | 0 | 0 | 0 | 0 | 0 | 0 | 0 | 1 | 0 | 0 |
| 18 | 1 | 0 | 0 | 0 | 1 | 1 | 1 | 0 | 1 | 0 | 0 |
| 19 | 1 | 0 | 0 | 1 | 0 | 1 | 0 | 0 | 1 | 0 | 0 |
| 20 | 1 | 0 | 0 | 1 | 1 | 1 | 0 | 0 | 1 | 0 | 0 |
| 21 | 1 | 0 | 1 | 0 | 0 | 0 | 0 | 0 | 0 | 0 | 1 |
| 22 | 1 | 0 | 1 | 0 | 1 | 1 | 1 | 0 | 0 | 0 | 1 |
| 23 | 1 | 0 | 1 | 1 | 0 | 0 | 0 | 1 | 0 | 0 | 1 |
| 24 | 1 | 0 | 1 | 1 | 1 | 1 | 0 | 1 | 0 | 0 | 1 |
| 25 | 1 | 1 | 0 | 0 | 0 | 0 | 0 | 0 | 0 | 1 | 0 |
| 26 | 1 | 1 | 0 | 0 | 1 | 1 | 1 | 1 | 0 | 1 | 0 |
| 27 | 1 | 1 | 0 | 1 | 0 | 1 | 1 | 0 | 0 | 1 | 0 |
| 28 | 1 | 1 | 0 | 1 | 1 | 1 | 1 | 0 | 0 | 1 | 0 |
| 29 | 1 | 1 | 1 | 0 | 0 | 0 | 0 | 0 | 0 | 0 | 1 |
| 30 | 1 | 1 | 1 | 0 | 1 | — | — | — | — | — | — |
| 31 | 1 | 1 | 1 | 1 | 0 | 1 | 1 | 1 | 0 | 0 | 1 |
| 32 | 1 | 1 | 1 | 1 | 1 | 1 | 1 | 1 | 0 | 0 | 1 |

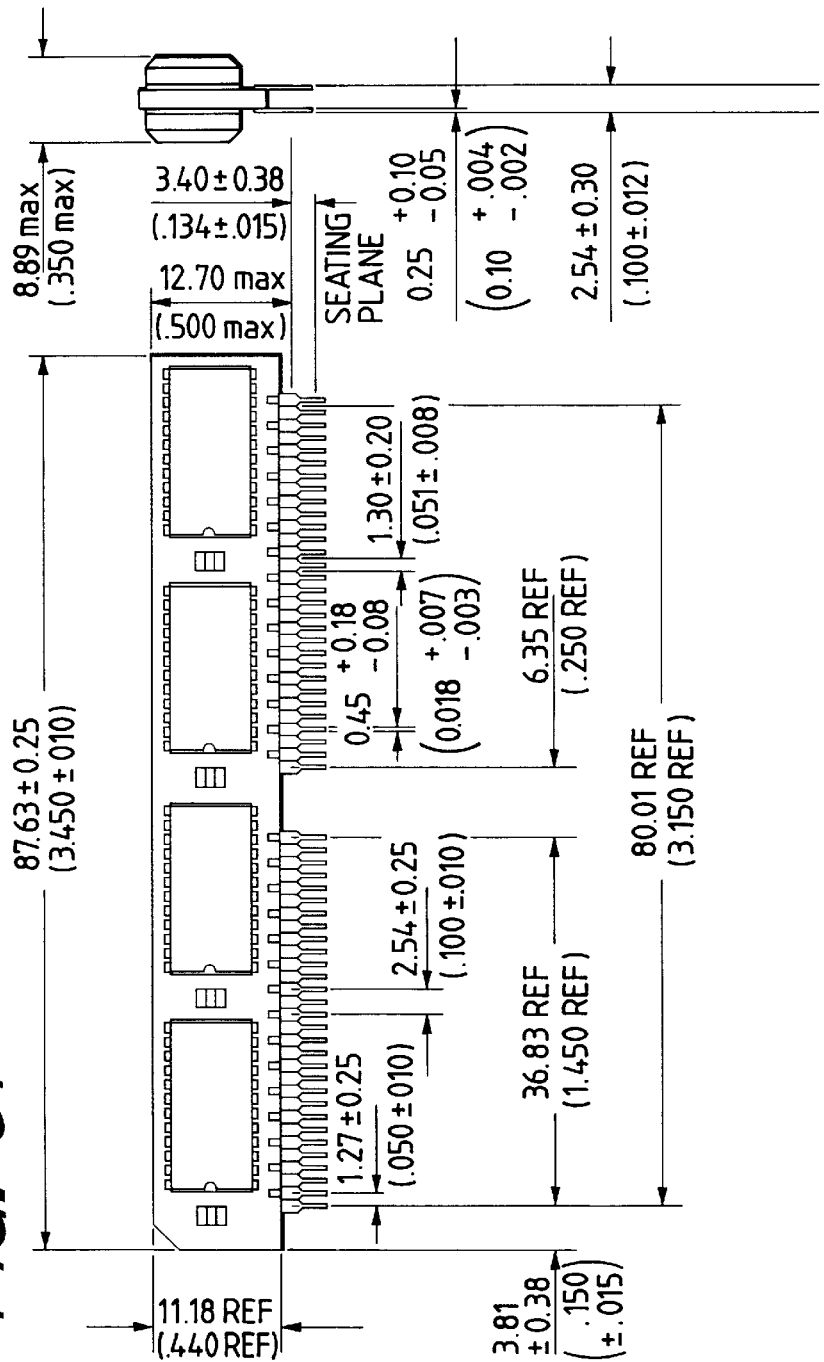
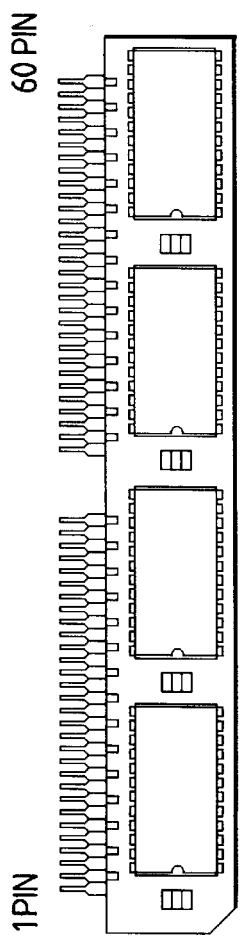
FIG. 31

(TOP PLAN VIEW)

FIG. 37
PRIOR ART

| NAME OF PIN | FUNCTION |
|---|---|
| A0-A16 | ADDRESS INPUT |
| I/O0-I/O8 | DATA INPUT/OUTPUT |
| $\overline{WE}$ | WRITE ENABLE |
| $\overline{OE}$ | OUTPUT ENABLE |
| $\overline{CE}$ | CHIP ENABLE |
| CLK | CLOCK INPUT |
| Vcc | POWER SOURCE |
| Vss | GROUND |
| NC | NO CONNECTION (IN CASE OF X8) |

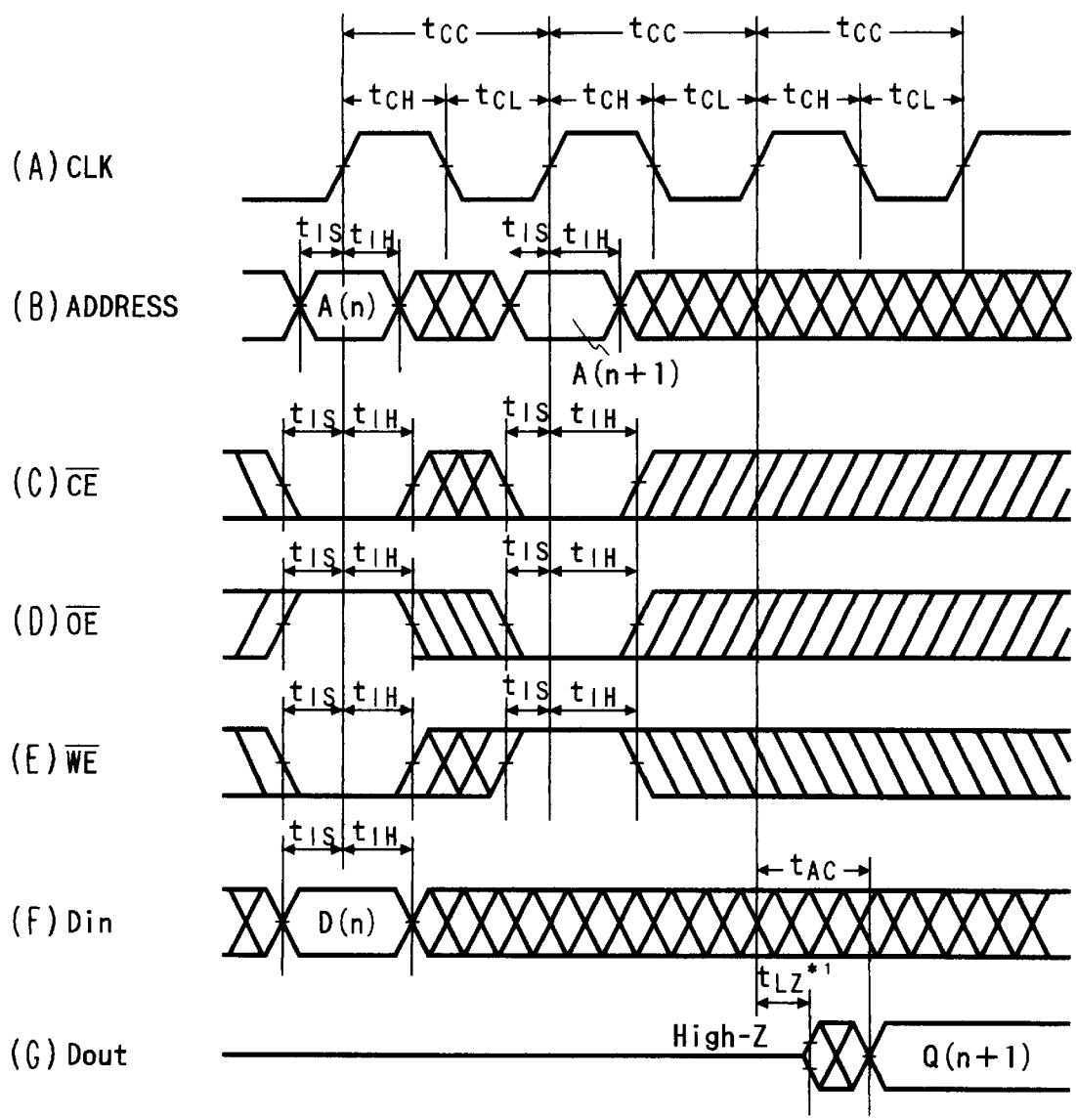

SEMICONDUCTOR MEMORY DEVICE AND INFORMATION PROCESSOR USING THE SAME

BACKGROUND OF THE INVENTION

1. Field of the Invention

The present invention relates to a semiconductor memory device and an information processor using the semiconductor memory device, and more particularly to a semiconductor memory device and an information processor using the semiconductor memory device capable of executing pipeline processing for data reading and writing.

2. Description of the Related Art

In a conventional processor, in order to increase memory access speed, a second cache is often provided using synchronous SRAMs for data and for tag outside a processor chip in addition to an on-chip cache memory. The synchronous SRAM is a SRAM incorporating a register to carry out pipeline processing. Conventional synchronous SRAMs are described, for example, in Hitachi IC Memory Data Book, pp 899–909, edited by Hitachi Micro-computer System Technology Document Center, published by Semiconductor Department of Hitachi Ltd. FIG. 36 to FIG. 39 are drawings explaining the above examples. FIG. 36 is a view showing the arrangement of pins in a synchronous SRAM. FIG. 37 is a table explaining the functions of the pins. FIG. 38 is an overall block diagram of the synchronous SRAM. FIG. 39 is a chart explaining the operation timings of the synchronous SRAM under writing process. As shown in FIG. 36 and FIG. 37, the signal instructing to write data to a memory from a processor is only a WE (Write Enable) signal. The synchronous SRAM shown in FIG. 38 has registers in an address part and a data part. As shown in FIG. 39, at executing writing in the synchronous SRAM, address and data are delivered at the same time and further the WE signal is turned to low-state at the same timing.

Generally, as to control methods for a second cache, there is a write-through method where data is written both in a second cache and in a main memory, and a store-in method where data is written only in a second cache and the line in the second cache is rewritten in a main memory a line unit just before the line is to be overwritten by a new line.

In the store-in method, there is a dirty bit expressing that the line has been written. Although the store-in method is complex in control, it is known that the performance is generally improved since frequency of writing to the main memory is reduced. These technologies are described in the article by John Hennessy and David Patterson, "Quantitative Approach to Computer Architecture", pp 412–414, Morgan Knafmann Publishers, Inc.

Two processes of reading and writing are executed to the second cache. In the read process, reading is executed for a RAM for data and a RAM for tag at a time. However, in write process, data cannot be written in the RAM for data until a tag is read to execute a hit judgement. Therefore, since the timing of data transfer in the conventional method is different depending on whether a reading process or a writing process, it has been difficult to improve the throughput by pipelining by 1 cycle pitch. Further, the machine cycle is decreased due a bottle neck effect that occurs during a writing process, and the throughput is decreased as the result.

SUMMARY OF THE INVENTION

A first object of the present invention is to provide an information processor which, as a whole, achieves high performance as a whole by improving the throughput of the processor and a semiconductor memory device intended for use with the processor.

A second object of the present invention is to provide a semiconductor memory device having a high throughput.

A third object of the present invention is to provide, at low cost, various kinds of semiconductor memory devices which are suitable for use with a system having a high throughput.

An information processor according to the present invention comprises a memory having a buffer for temporarily holding data and, a processor having a memory interface part for controlling the memory to transfer data to the buffer before determining whether the data is to be written in the memory and to write the data in said memory after a determination has been made that the data should be written in the memory.

In the above-identified information processor, the memory interface part comprises a controller for controlling in such a manner as to deliver an address of data to be written and a data transfer signal to the memory according to a clock signal, and then to deliver the data to the memory after delivering the data transfer signal.

It is preferable that the controller comprises a means for delivering the address of data to be written and the data transfer signal to the memory at the same timing.

Further, it is preferable that the controller comprises data writing determining means for determining whether the data temporarily held in the buffer is to be written in the memory.

The memory device according to the present invention comprises a memory main part, a controller for writing data in the memory main part, and a temporary buffer for temporarily holding data. The controller controls the memory main part so as to hold transferred data in the buffer after receiving an address of data to be written in the memory main part and a data transfer signal, and to write the data in the memory main part based on a write instruction signal issued based on whether the held data is to be written in the memory main part.

It is preferable that the controller comprises a means for register the data held in the temporary buffer to the write buffer according to the write instruction signal.

Further, an embodiment of the memory device according to the present invention comprises a plurality of write buffers, and the controller comprises a means for controlling the plurality of write buffers to sequentially store the data held in the write buffers in the write buffers according to the write instruction signal.

It is preferable that the controller comprises a means for controlling which data among the items of data stored in the plurality of write buffers is written in the memory main part. Further, it is preferable that the memory device comprises a bus for outputting the contents of the plurality of write buffers.

The processor can deliver a write signal according to the content in the tag memory after data and a data transfer signal have been delivered to the data memory. Since the data transfer timings of reading from a memory and writing in the memory can be executed at the same time, the reading process and the writing process can be performed by a pipeline-like process and thus the throughput can be improved.

In a case of employing a store-in method, the processor can deliver a write signal and a dirty bit according to the content in the tag memory after data and a data transfer signal have been delivered to the data memory. Since the data transfer timings of reading from a memory and writing in the memory can be executed at the same time, the reading process and the writing process can be performed by a pipeline-like process and thus the throughput can be improved.

Further, the semiconductor memory device can receive a write signal according to the content in the tag memory after the semiconductor memory device has received a data transfer signal and data. Since the data transfer timings of reading from a memory and writing in the memory can be executed at the same time, the reading process and the writing process can be performed by a pipeline-like process and thus the throughput can be improved.

Since the semiconductor memory device can be used for either a data memory device or a tag memory device by changing the control terminal in the memory device to high-state or low-state, it is possible to provide various kinds of semiconductor memory devices suitable for a high throughput system at low cost.

BRIEF DESCRIPTION OF THE DRAWINGS

FIG. 11 is a table explaining the operation of the construction of the first embodiment of the second cache of FIG. 9.

FIG. 13 is a table explaining the operation of the construction of the second embodiment of the second cache of FIG. 9.

FIG. 18 is a table explaining the operation of the write bypass controller 1500 of FIG. 17.

FIG. 31 is a view explaining the construction of an embodiment of module mountings of the RAMs 100 and 101 of FIG. 1.

FIG. 37 is a table explaining the pins in an example of a conventional RAM.

FIG. 39 is a chart explaining the operation timing of an example of a conventional RAM.

DETAILED DESCRIPTION OF THE PREFERRED EMBODIMENTS

Figure 1:
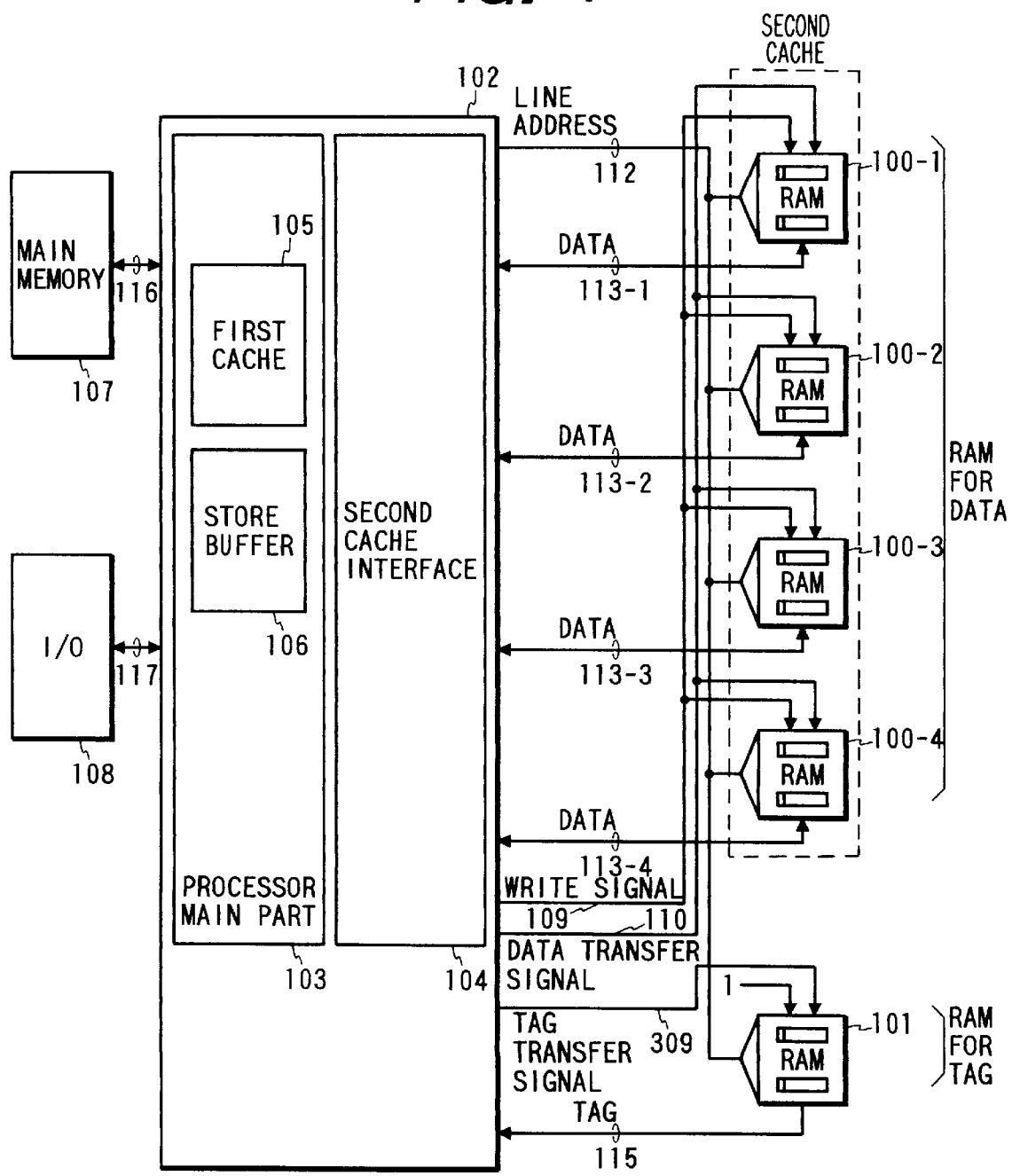
FIG. 1 is an overall diagram of a first embodiment in accordance with the present invention.

A first embodiment of the present invention will be described in detail below, referring to FIG. 1 and FIG. 2. FIG. 1 is a diagram showing the overall system of the first embodiment of an information processor in accordance with the present invention. The reference characters 100-1 to 100-4 are synchronous high-speed SRAMs (Static Random Access Memory) for storing second cache data formed a semiconductor. The synchronous memory is a memory containing a register for pipeline, and the construction will be described in detail later. The reference character 101 is a synchronous high speed SRAM storing a V bit indicating that tag and entry of a second cache are enabled. The reference character 102 is a one-chip processor, the reference character 103 is a processor main part, the reference character 104 is a second cache interface, the reference character 105 is a first cache, and the reference character 106 is a store buffer. The reference character 107 is a main memory, and the reference character 108 is an input/output unit. The processor 102 is composed of the processor main part 103 and the second cache interface 104. The processor main part 103 includes the first cache 105 and the store buffer 106. The processor 102 controls the main memory 107 through the main memory interface 116, and controls the I/O interface 108 through an I/O interface 117. Further, the processor 102 delivers a line address 112 to the data RAMs 100-1 to 100-4 and to the tag RAM 101. Furthermore, the processor 102 reads and writes the data RAMs 100 through data to and from buses 113-1 to 113-4, and the tag RAM 101 through a tag bus 115. Further, the processor 102 delivers a data transfer signal 110 and a write signal 109 to the data RAM 100-1 to 100-4, and a tag transfer signal 309 to the tag RAM 101.

The RAM 100-1 is connected to the data bus 113-1, the line address 112, the data transfer signal 109 and the write signal 109. The data bus 113-1 is used both for delivery of data from the processor 102 to the RAM 100-1, and for delivery of data from the RAM 100-1 to the processor 102. The signal to discriminate between them is the data transfer signal 110 which is '1' when data is delivered from the processor 102 to the RAM 100-1. When the write signal is '1', the data delivered through the data bus 113-1 is written in an address indicated by the line address 112 of the RAM 100-1. When the write signal is '0', an address indicated by the line address 112 is read out of the RAM 100-1 and sent to the processor 102 through the data bus 113-1. The control for the other RAMs is the same as above.

The information processor has a two-level type cache memory composed of an on-chip, small capacity, first cache memory and a second cache memory constructed with a high speed SRAM. Although there are various ways of naming an entry in a cache, in this specification an entry in an second cache is called a "line" and the entry in the first cache is called a "block". In the first embodiment, let the line size of the second cache be 16B, and the block size of the first cache be 16B. Further, it is assumed that the data RAM is of 4 B width and 1 Mb capacity. That is, the data buses 113-1 to 113-4 of the processor 102 of 16 B width and the total capacity of the second cache is 0.5 MB. For the purpose of simplicity, it is assumed that during a store command, only data of 16 B width is written. The second cache is of a direct map method. That is, when 32-bit address of byte representation is divided from the start of memory into an in-line address part, a RAM search line address part and a tag part, they are allocated 4, 15, 13 bits, respectively. Therefore, it is sufficient that the tag RAM has 14 bits including 1 bit of an enable signal V bit. This direct map method is described in the aforementioned reference. As to be described later, it is possible to change the block size, the line size or the store data width. In this embodiment, both of the second cache and the first cache are of store-through method. It is also assumed that when cache miss occurs in a store command, cache updating is not executed.

A description of the operation of the processor main part 103 for controlling the cache using the second cache interface will now be made. In executing a load command, the first cache 105 is initially searched. If there exists a block containing concerned data, data is read from the first cache 105. If not, data is read from the data RAMs 100-1 to 100-4 and the tag RAM 101 through the second cache interface 104, and the tag RAM is searched. If a hit is found, the concerned block is transferred to the first cache 105. This operation is hereinafter referred to as BT (Block Transfer). If the concerned data is not found in the second cache either, a line containing the concerned data is read from the main memory and written in the data RAMs 100-1 to 100-4 through the second cache interface 104 and the tag is registered in the tag RAM 101. This transfer operation from the main memory to the second cache is hereinafter referred to as LT (Line Transfer). Further, the writing operation of the second cache interface 104 to the data RAM 100 is abbreviated as LTW. The processor main part 103 executes a BT through the second cache interface 104 after an LT.

At executing a store command, if a hit is found in the first cache, data is written in the first cache. Further, the data is also written in the second cache by starting up the second cache interface 104 through the store buffer 106. That is, the second cache interface 104 searches the tag RAM 101, and writes data in the data RAMs 100-1 to 100-4 if a line containing the data stored in the store buffer 106 is in the second cache. The operation is hereinafter abbreviated as W (Write). The processor main part 103 writes data in the main memory 107 as well as in the first and second caches described above. When the first and the second caches are missed, the data is written only in the main memory 107 and a BT and an LT are not executed.

In summary, taking note of the operation of the second cache interface 104, the second cache interface 104 executes three processes, a BT process for reading the data RAMs 100-1 to 100-4 and the tag RAM 101, an LTW process for writing in the data RAMs 100-1 to 100-4 and the tag RAM 101, a W process for writing data in the data RAMs 100-1 to 100-4 if a hit is found. The frequencies of occurrence of the three operations depend on the program performed in the information processor. Assuming the frequency of load command, the frequency of store command, the miss ratio per access for the first cache and the miss ratio per access for the second cache be 30%, 10%, 20% and 10% respectively, the frequencies of occurrence per command are 0.06(0.3× 0.2) for the BT process, 0.006(0.3×0.2×0.1) for the LTW process and 0.1 for W process. The frequency of occurrence for the W process is high, and therefore it is important to increase the speed of W process.

Figure 2:
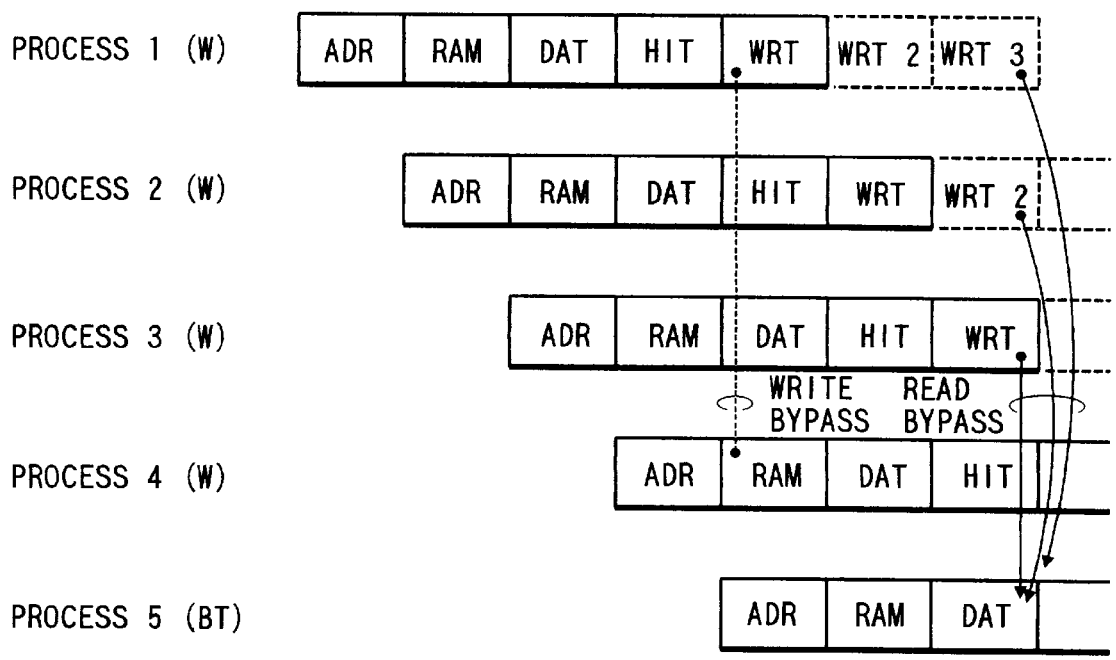
FIG. 2 is a chart explaining the operation of the first embodiment in accordance with the present invention.

As shown in FIG. 2, the second cache interface 104 controls the data RAMs 100-1 to 100-4 and the tag RAM 101 using pipelines of five-stage structure: ADR, RAM, DAT, HIT, WRT. The ADR stage is a stage for delivering a line address 112, a tag transfer signal 309 and a data transfer signal 309 to the data RAMs 100-1 to 100-4 and the tag RAM 101. The RAM stage is a stage for executing reading and writing between the RAMs. The DAT stage is a stage for transferring data between the processor and the RAM. The HIT stage is a stage in which the second cache interface 104 perform hit judgement of cache and deliver a write signal 109 to the data RAMs 100-1 to 100-4. The WRT stage is a stage for writing data in the data RAM 100-1 to 100-4 and the tag RAM 101. In the W process, the processor 102 transfers data having a probability to be written in the DAT stage from the processor 102 to the data RAMs 100-1 to 100-4 in advance, and the HIT stage notifies through the write signal 109 whether or not the data is to be actually written.

Each of the data RAMs 100-1 to 100-4 is composed of a memory main part and tri-state WRT buffers, an example of the construction of which will be described later. The writing in the WRT stage described above is not performed to the memory main part but to one of the three WRT buffers. The reason is that when the three processes, LTW, BT and W, are performed with one cycle pitch as described above, a stage capable of using the RAM is only a RAM stage and writing must be performed in this stage. However, at the RAM stage, whether writing is actually executed or not is not known since the tag checking by the second cache interface 104 has not been completed yet. At the RAM stage of the W process, when effective items of data exist in the tri-state buffers, the oldest item of the data among them is written in the memory main part. When W processes continue as shown in FIG. 2, only the fourth W process in a RAM stage can execute the writing determined by the first W process. This feature is shown by a dotted line in FIG. 2 indicated by write "bypass". Therefore, three WRT buffers are required for the first to the third W processes. When a BT process continues after process 4, the items of written data from the first to the third W processes are being held in the three WRT buffers, and the write data by the first W process is not written in the memory main part until the next W process comes. On the other hand, as shown by the solid line arrows in FIG. 2 indicated by "read bypass", when the fifth process is a BT process and agrees with the address of the data held in the WRT buffer, the content of the WRT buffer is read and transferred to the processor 102. However, it is impossible that the content written by the fourth W process is read by the fifth BT process and transferred to the processor. This is because writing of the fourth W process is not determined yet at the DAT stage of the fifth BT process. In order to prevent miss-operation, the processor controls so that a BT process just after a W process to the same address as that of the W process is not executed. This control will be described in detail later, referring to FIG. 10 to FIG. 13.

A second embodiment of the present invention will be described in detail below, referring to FIG. 3 to FIG. 23. The construction of the second embodiment is nearly the same as the first embodiment. Like parts in each of the figures are identified by the same reference characters. One different point however, lies in a W process of the second cache. In the second embodiment, when a hit is found in the second cache at executing a store command, data is written in the second cache but is not written in the main memory 107. This method is called a store-in method. The data RAM 100-4 has a D (Dirty) bit of one bit in order to indicate to hold data different from that in the main memory. When a new line transferred from the main memory 107 is written in a line set with a D bit at an LTW process, the line set with the D bit is rewritten in the main memory 107 at first and then the new line is written. Although an example of the construction of each part in the second embodiment of a store-in method will be described below, it is possible to obtain each part in the first embodiment easily except that for the D bit process described above in the second embodiment.

Figure 3:
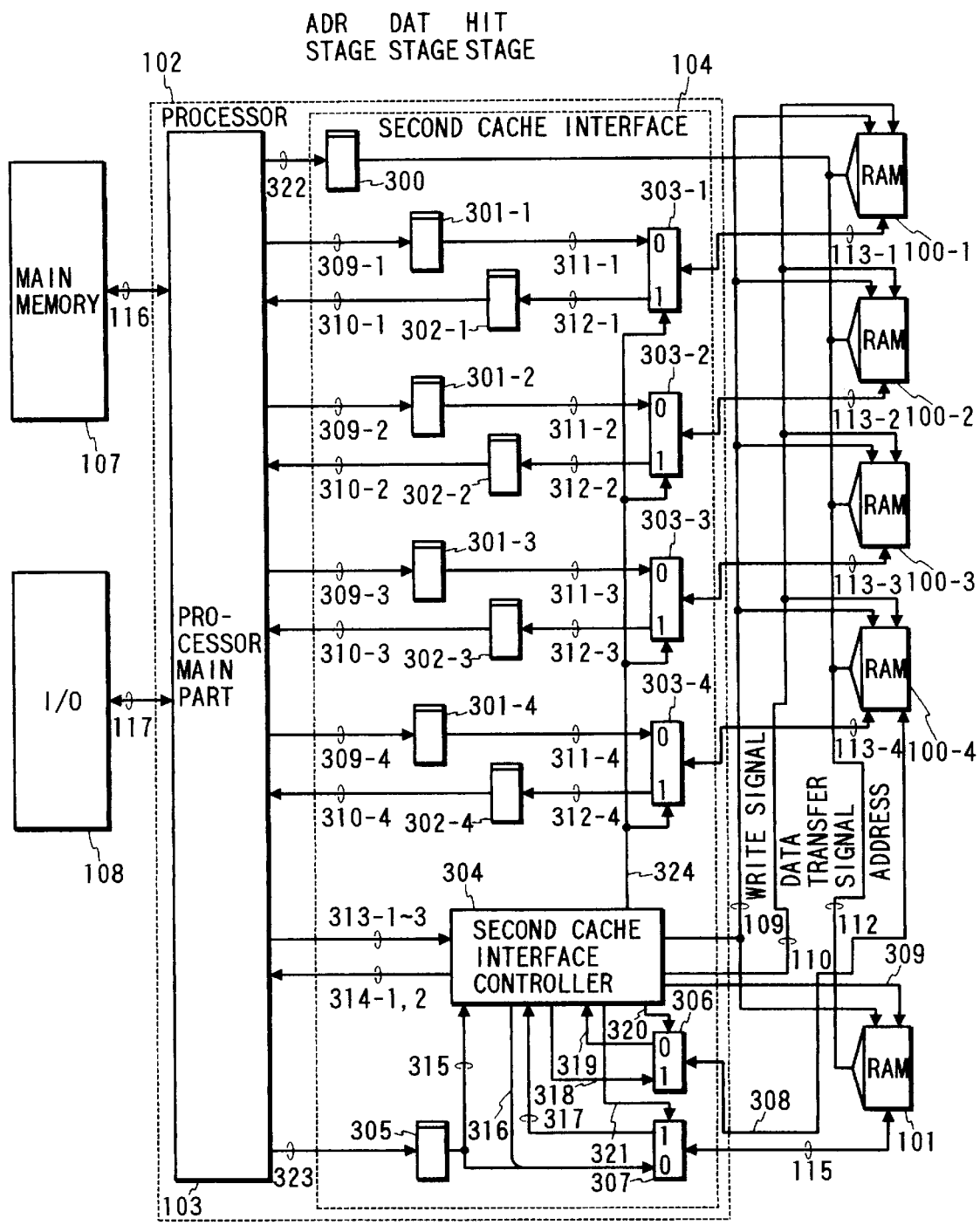
FIG. 3 is an overall diagram of a second embodiment in accordance with the present invention.

FIG. 3 is a diagram showing the overall system of the second embodiment in accordance with the present invention. Like parts in the figures are identified by the same reference characters in FIG. 1, and an explanation will be omitted here. The processor main part 103 notifys the second cache interface 104 of the three processes of LTW, BT, W by request signals 313-1 to 313-3. The following operation is executed in the LTW process. The processor main part 103 notifys the second cache interface 104 of the line address, the tag and the data using signals 322, 323, 309-1 to 309-4. In the BT process, the following operation is executed. The processor main part 103 notifys the second cache interface 104 of the line address using the line address signal 322 and receives the data read from the second cache interface 104 through signals 310-1 to 310-4, and also receives a hit signal 314-1 indicating whether the second cache is hit and a signal 314-2 indicating the content of a D bit of a line to be expelled when a miss is caused. In the W process, the following operation is executed. The processor main part 103 notifys the second cache interface 104 of the line address, the tag and the data using the signals 322, 323, 309-1 to 309-4. The second cache interface 104 writes and reads a D bit to and from the data RAM 100-4 through a bus 308. When there is no request from the processor main part 103, the second cache interface 104 may do nothing. For the purpose of simplicity, it is assumed in this embodiment that the second cache interface performs BT processes. Since a BT process does not contain any writing operation, there is theoretically no problem if BT processes are repeated excessively. The processor main part 103 has no problem concerning its performance if the processor main part neglects the response to the BT process which the processor main part itself does not request. This BT process at idling may be called as an IDLE process in order to identify it from the true BT process. There is an effect to decrease power consumption by suppress line address transferring and RAM access by the IDLE process.

The above processes are performed by the same pipeline as the pipeline in the first embodiment described in FIG. 2. The interface between the processor 102 and the data RAMs 100-1 to 100-4 in this case will be described below, referring to FIG. 4 to FIG. 6.

Figure 4:
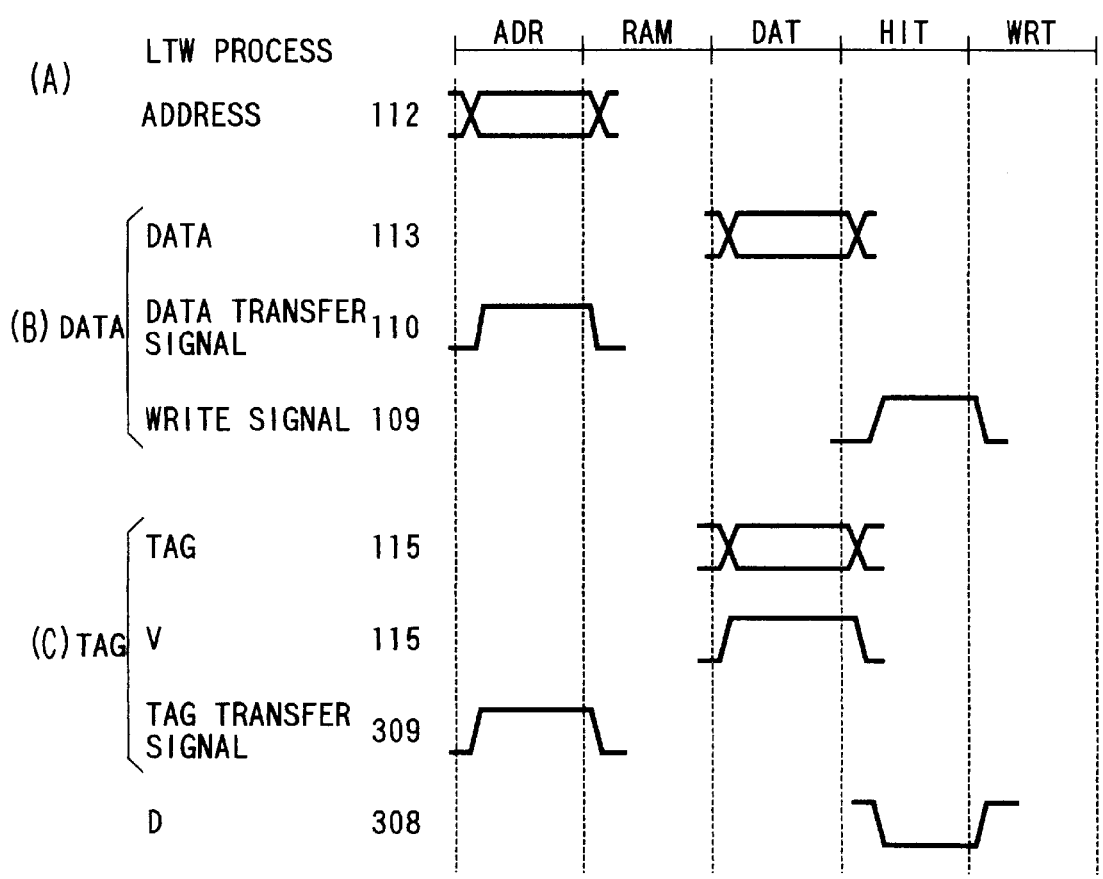
FIG. 4 is a timing chart of an LTW process.

FIG. 4 is a timing chart for explaining the interface in an LTW process.

In the ADR state, the processor 102 sends a line address 112. At the same time, the processor 102 notifies the data RAMs 100-1 to 100-4, by setting the data transfer signal to high, that data is transferred from the processor 102 to the data RAMs 100-1 to 100-4 at the DAT stage and the D bit at the HIT stage. Similarly, the processor 102 notifies the tag RAM 101, by setting the tag transfer signal 309 to high that a tag is transferred from the processor 102 to the tag RAM 101 at the DAT stage. In the DAT stage, the processor 102 drives the data bus 113 and the tag bus 115 to set the V bit to high in order to enable these lines. In the HIT stage, the processor 102 instructs the data RAMs 100-1 to 100-4 and the tag RAM 101 to write the data and the tag transferred at the DAT stage by setting the write signal 109 to high, and notifies the data RAM 100-4 to set the D bit corresponding to the data transferred at the DAT stage to 0 (zero) by setting the D bit bus to low.

Figure 5:
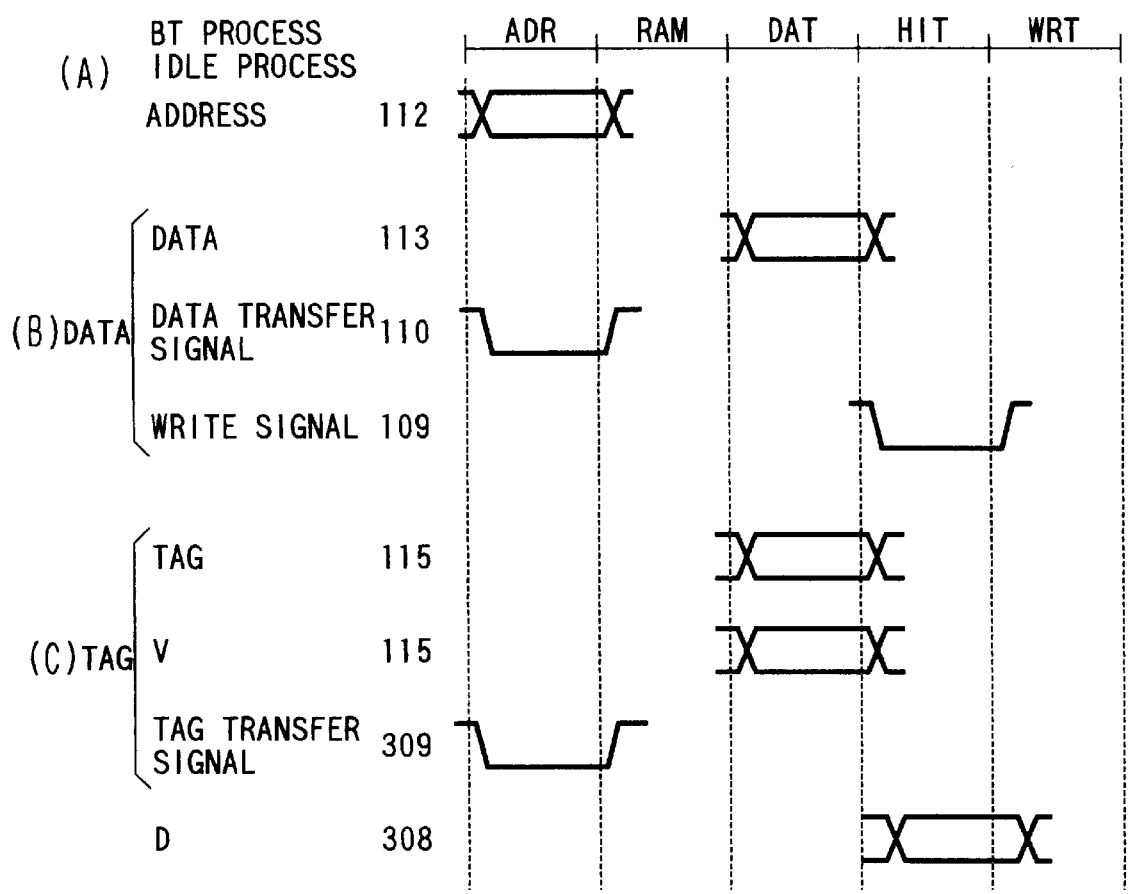
FIG. 5 is a timing chart of a BT process.

FIG. 5 is a timing chart for explaining the interface in a BT and IDLE processes. In the ADR state, the processor 102 sends a line address 112. At the same time, the processor 102 notifies the data RAMs 100-1 to 100-4, by setting the data transfer signal to low, that data is received from the data RAMs 100-1 to 100-4 at the DAT stage and the D bit at the HIT stage. Similarly, the processor 102 notifies the tag RAM 101, by setting the tag transfer signal 309 to low that data is received from the tag RAM 101 at the DAT stage. In the DAT stage, the data RAMs 100-1 to 100-4 puts data on the data bus 113 and the tag RAM 101 puts a tag and a V bit on the tag bus 115. In the HIT stage, the processor 102 instructs the data RAMs 100-1 to 100-4 and the tag RAM 101 not to write the data and the tag by setting the write signal 109 to low. Further, in the HIT stage, the tag RAM 101 puts the D bit corresponding to the data transferred at the DAT stage on the D bit bus.

Figure 6:
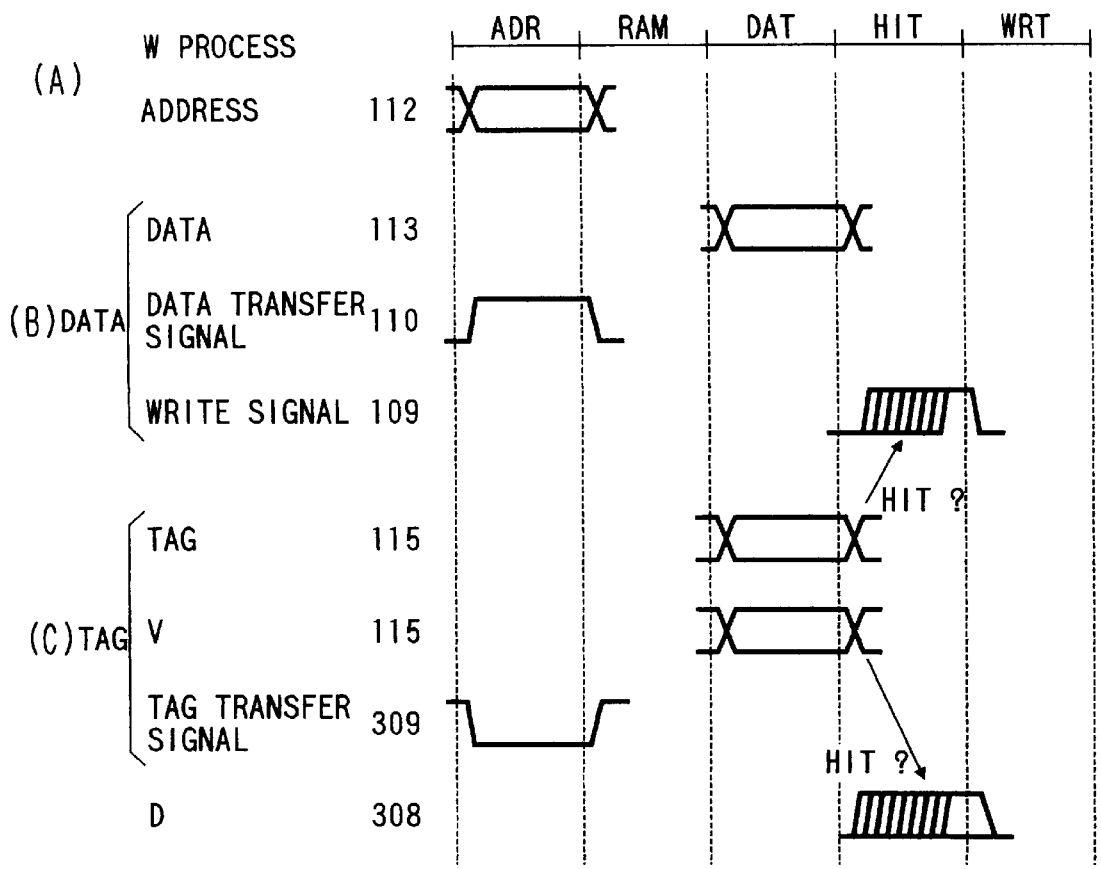
FIG. 6 is a timing chart of a W process.

FIG. 6 is a timing chart for explaining the interface in a W process. In the ADR state, the processor 102 sends a line address 112. At the same time, the processor 102 notifies the data RAMs 100-1 to 100-4, by setting the data transfer signal to high, that data is transferred to the data RAMs 100-1 to 100-4 at the DAT stage and the D bit at the HIT stage. Similarly, the processor 102 notifies the tag RAM 101, by setting the tag transfer signal 309 to low, that the processor 102 receives data from the tag RAM 101 at the DAT stage. In the DAT stage, the processor 102 puts the data on the data bus 113 and the tag RAM 101 puts the tag and the V bit on the tag bus 115. The processor 102 search the tag received at the DAT stage. If a hit is found, in the HIT stage the processor 102 notifies the data RAMs 100-1 to 100-4 to write the data transferred at the DAT stage by setting the write signal 109 to high, and notifies the data RAM 100-4 to set the D bit corresponding to the data transferred at the DAT stage to 1 (one) by setting the D bit bus to high. If a hit is not found, in the HIT stage the processor 102 notifies the data RAMs 100-1 to 100-4 by setting the write signal 109 to low not to write the data transferred in the DAT stage and the D bit transferred in the HIT stage.

Although it is required that in the BT process data is transferred as soon as possible to reduce BT penalty, in the W process the data cannot be written until the hit check is executed. As described above, according to the embodiment, a W process and a BT process can be performed by, one; a pipeline process by providing two signals (the data transfer signal 110 and the write signal 109) and, then, transferring data to the processor 102 in the DAT stage of the BT process, and transferring data in the W process regardless of a hit of the cache, to instruct whether or not writing is actually to be performed later using the write signal 109, depending on the result of the tag.

Writing control and bypass control in the second embodiment are the same as the writing control and the bypass control using the data RAMs 100-1 to 100-4 and the tri-state WRT buffers in the tag RAM 101 in the first embodiment, all of which will be described with reference to FIG. 2. However, the data RAM 100-4 holds a line address, data and a D bit in the WRT buffer and it writes the data and the D bit in the memory main part in the RAM stage of the W process. If the D bit is held in the tag RAM 101, two kinds of accesses, reading-from and writing-in of the memory main part, are required in the tag RAM 101 in the W process. Therefore, the W process cannot be performed by one cycle pitch. Since the data RAM 100-4 executes only writing to the memory main part in the W process, even if the data RAM 100-4 also holds the D bit, pipelining of the W process by one cycle pitch can be realized. In summary, pipelining of the W process can be realized by holding the D bit in the data RAM 100-4, but not in the tag RAM 101, and utilizing the WRT buffer.

An example of the construction of the second cache interface 104 will be described below, referring to FIG. 3. The second cache interface 104 is composed of a second cache interface controller 304, registers 300, 301-1 to 301-4, 302-1 to 302-4, 305, bi-directional switches 303-1 to 303-4, 306, 307. In FIG. 3 to FIG. 22, the register is illustrated by a box having a line in the upper side inside the box. All of the registers are of an edge type which captures data at the rising edge of the clock. The clock signal is omitted here for the purpose of simplicity. Actually, a one-phase clock is distributed to the registers in the processor 102, the data RAMs 100-1 to 100-4, and the tag RAM 101.

The register 300 is a register in the ADR stage for holding an address which the processor main part 103 transmits to the data RAMs 100-1 to 100-4 and the tag RAM 101 through the bus 322. The registers 301-1 to 301-4 are registers in the DAT stage for holding data which the processor main part 103 transmits to the data RAMs 100-1 to 100-4 through the buses 113-1 to 113-4. The registers 302-1 to 302-4 are registers in the HIT stage for holding data which the processor main part 103 receives from the data RAMs 100-1 to 100-4 through the buses 113-1 to 113-4. The register 305 is a register in the ADR stage for holding an address which the processor main part 103 transmits to the tag RAM 101 through the bus 115. The bi-directional switches 303-1 to 303-4, 306, 307 are switches for the data buses 113-1 to 113-4, the D bit bus 308, the tag bus 115, respectively.

The second cache interface controller 304 performs the processing described with referring to FIG. 4 to FIG. 6 by receiving the LTW request signal 313-1, the BT request signal 313-2, the W request signal 313-3 from the processor main part 103, the tag 315 from the register 305, the tag and the bit input 317 from the bi-directional switch 307, the D bit input 319 from the bi-directional switch 306, and by sending the data input instruction signal 324, the D bit instruction signal 320, the tag input instruction signal 321 to the bi-directional switches 303-1 to 303-4, 306, 307, respectively, the write signal 109 to the data RAMs 100-1 to 100-4 and the tag RAM 101, the data transfer signal 110 to the data RAMs 100-1 to 100-4, the tag transfer signal 309 to the tag RAM 101, the D bit output 318 to bi-directional switch 306, the V bit output 316 to the bi-directional switch 307, and returns the D bit 314-2 and the hit signal 314-1 to the processor main part 103.

Figure 7:
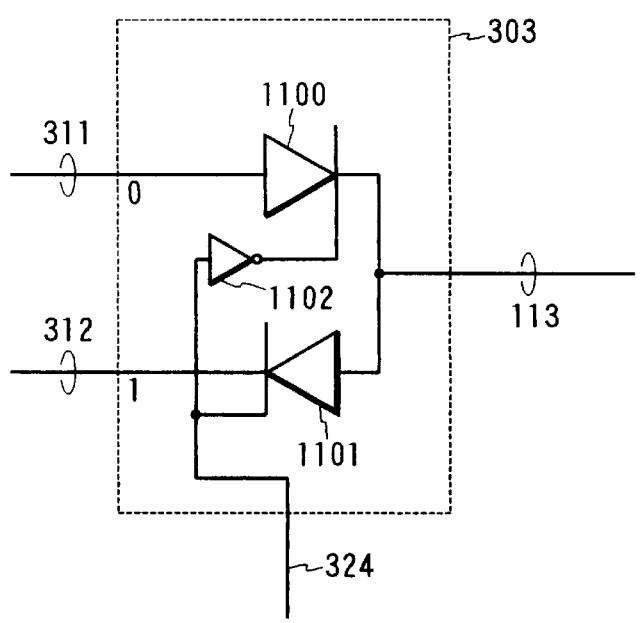
FIG. 7 is a diagram explaining the construction of an embodiment of the bi-directional switch 303 of FIG. 3.

FIG. 7 shows an embodiment of the bi-directional switch 303. The reference character 1102 is an inverter, the reference characters 1100 and 1101 are tri-state buffers.

Figure 8:
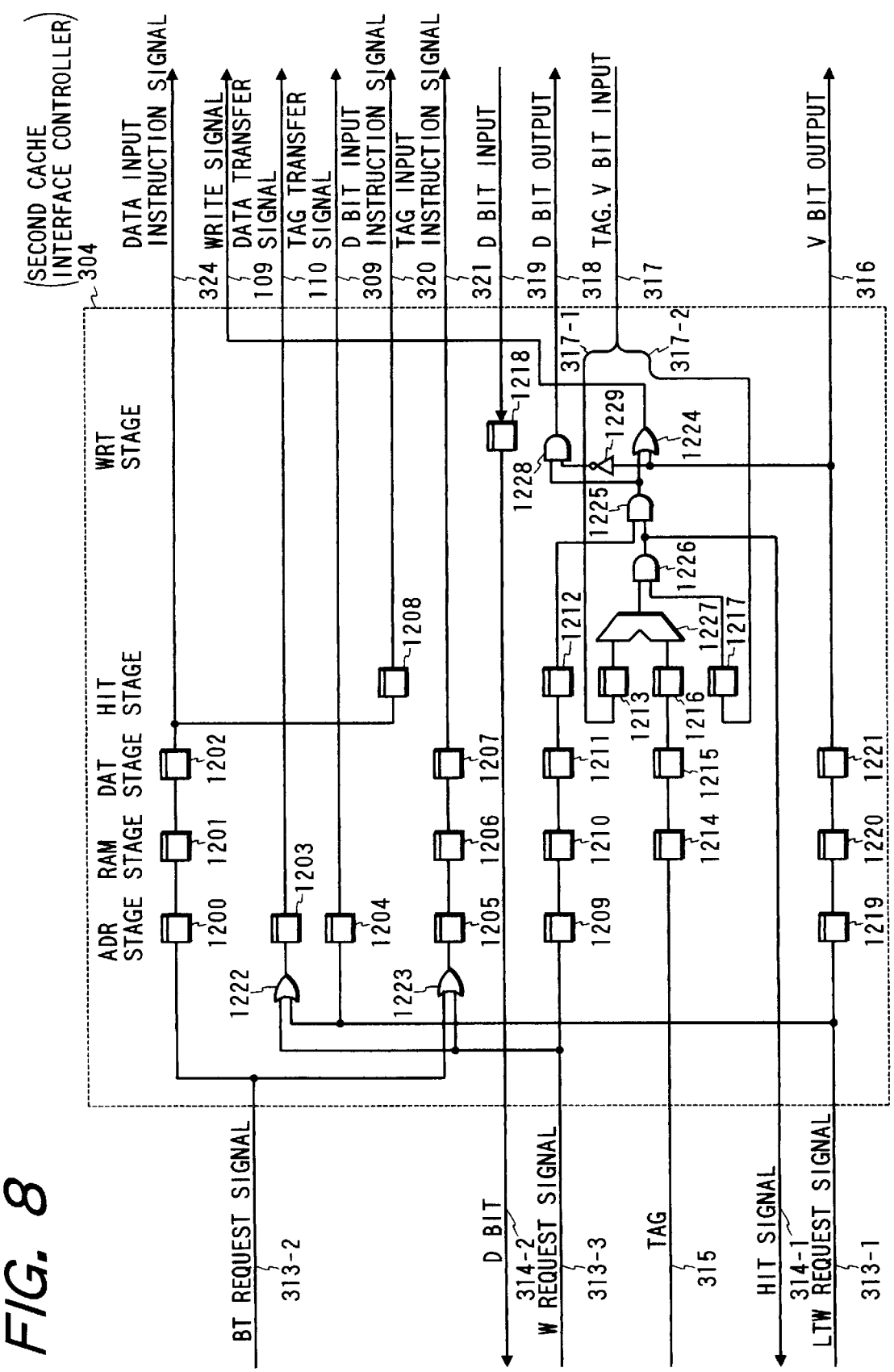
FIG. 8 is a diagram explaining the construction of an embodiment of the second cache interface controller 304 of FIG. 3.

FIG. 8 shows an embodiment of the second cache interface controller 304.

The reference characters 1200 to 1221 are registers, the reference characters 1222 to 1224 are OR gates, the reference characters 1225, 1226, 1228 are AND gates, and the reference character 1229 is an inverter. When the BT request signal 313-2 becomes 1 (one), the data input instruction signal 324 and the D bit input instruction signal 320 are set to 1 (one). When the BT request signal 313-2 or the W request signal 313-3 becomes 1 (one), the tag input instruction signal 321 is set to 1 (one). When the LTW request signal 313-1 or the W request signal 313-3 becomes 1 (one), the data transfer signal 110 is set to 1 (one). When the LTW request signal 313-1 becomes 1 (one), the tag transfer signal 309 and the V bit output 316 are set to 1 (one). when the gate 315 and the tag input signal 317-2 agree with each other and the V bit input 317-2 is 1 (one), the hit signal 314-1 is set to 1 (one). When hit signal 314-1 is 1 and the W request signal 313-3 is 1 (one), or when the LTW request signal is 1 (one), the write signal 109 is set to 1 (one). When the hit signal 314-1 is 1 (one) and the W request signal 313-3 is 1 (one) and the LT request signal 313-1 is 0 (zero), the D bit output 318 is set to 1 (one).

Figure 9:
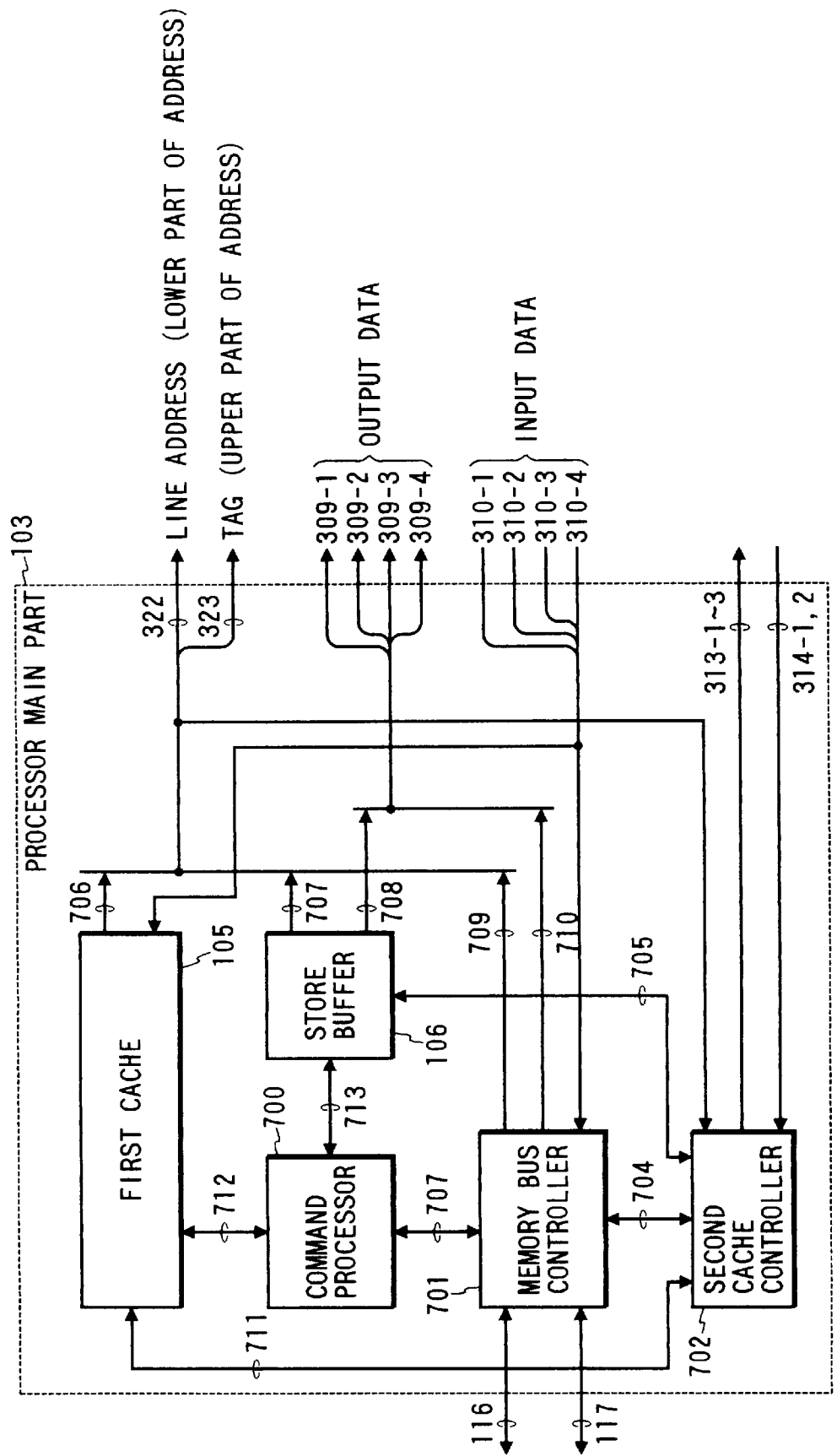
FIG. 9 is a diagram explaining the construction of an embodiment of the processor main part 103 of FIG. 3.

FIG. 9 shows an embodiment of the construction of the processor main part 103 shown in FIG. 3. The processor main part 103 is composed of a command control part 700, a first cache 105, a store buffer 106, a memory bus controller 701 and a second cache controller 702. The command control part 700 reads from and writes in the first cache 105 through the interface 712, and writes in the second cache using the store buffer 106 through the interface 713, and reads from and writes in the main memory using the memory bus controller 701 through the interface 707. When the first cache 105 receives a request to read out data from the command control part 700 but the corresponding data does not exist in the cache, the first cache outputs the signal 706 of the address of the required data to output a request of a BT process to the second cache controller 702 through the interface 711. When there remain write requests to the second cache in the store buffer 106, the store buffer outputs the signal 707 of the address and the signal 708 of the data to request the W process to the second cache controller 702 through the interface 705. When the bus controller 701 is notified of arrival of the data under LT from the main memory 107 shown in FIG. 3 through the interface 116, the bus controller outputs the signal 710 of the data to request the LTW process to the second cache controller 702 through the interface 704.

The second cache controller 702 selects one among the three requested processes, LTW, BT, W processes. When the LTW process is performed, the second cache controller 702 outputs the address signal 709 from the memory bus controller 701 to the addresses 322, 323 and the data signal 710 to the output data 309-1 to 309-4, and puts the LTW request signal 313-1 to 1 (one). When the BT process is performed, the second cache controller 702 outputs the address signal 706 from the first cache 105 to the addresses 322, 323, and puts the BT request signal 313-2 to 1 (one). When the W process is performed, the second cache controller 702 outputs the address signal 707 from the store buffer 106 to the addresses 322, 323 and the data signal 708 to the output data 309-1 to 309-4, and sets the W request signal 313-3 to 1 (one). At that time, as described with referring to FIG. 2, a tag having the same line address written in the LTW process cannot be read out by the BT process or the W process issued at the next cycle just after the LTW process. Data having the same line address written in the W process or the LTW process cannot be read out by the BT process issued at the next cycle just after the W process either.

The construction of a first embodiment of the second cache controller 702 will be described, referring to FIG. 10 and FIG. 11. In this embodiment of the construction, when the second cache controller 702 is notified in the BT process by the second cache interface 104 shown in FIG. 3 through the signal 314-1 that the hit signal is 1 (one), the second cache controller 702 instructs the first cache through the interface 711 of FIG. 9 to receive the input data 310-1 to 301-4. On the other hand, when the second cache controller 702 is notified in the BT process by the second cache interface 104 shown in FIG. 3 through the signal 314-1 that the hit signal is 0 (zero), the second cache controller 702 outputs the LT request to the memory controller 701 through the interface 704. Further, when the second cache controller 702 is notified by the second cache interface 104 through the signal 314-2 that the D bit is 1 (one), the second cache controller 702 instructs the memory controller 701 to transfer the input data 310-1 to 310-4 to the main memory. The second cache controller 702 does not perform the W process to the same line address until the data in the LT arrives and the LTW process is issued.

FIG. 11 is a table showing the control algorithm in the construction of the first embodiment of the second cache controller 702. When an LTW process request exists, the LTW process is performed. When an LTW process request does not exist but a BT process request exists, an IDLE process is executed if the preceding cycle is an LTW process or a W process to the same line, and a BT process is executed if not.

When an LTW process request and a BT process request do not exist but a W process request exists, an IDLE process is executed if the preceding cycle is an LTW process to the same line or a W process to the same line as the line under LT from the main memory, and a W process is executed if not.

Figure 10:
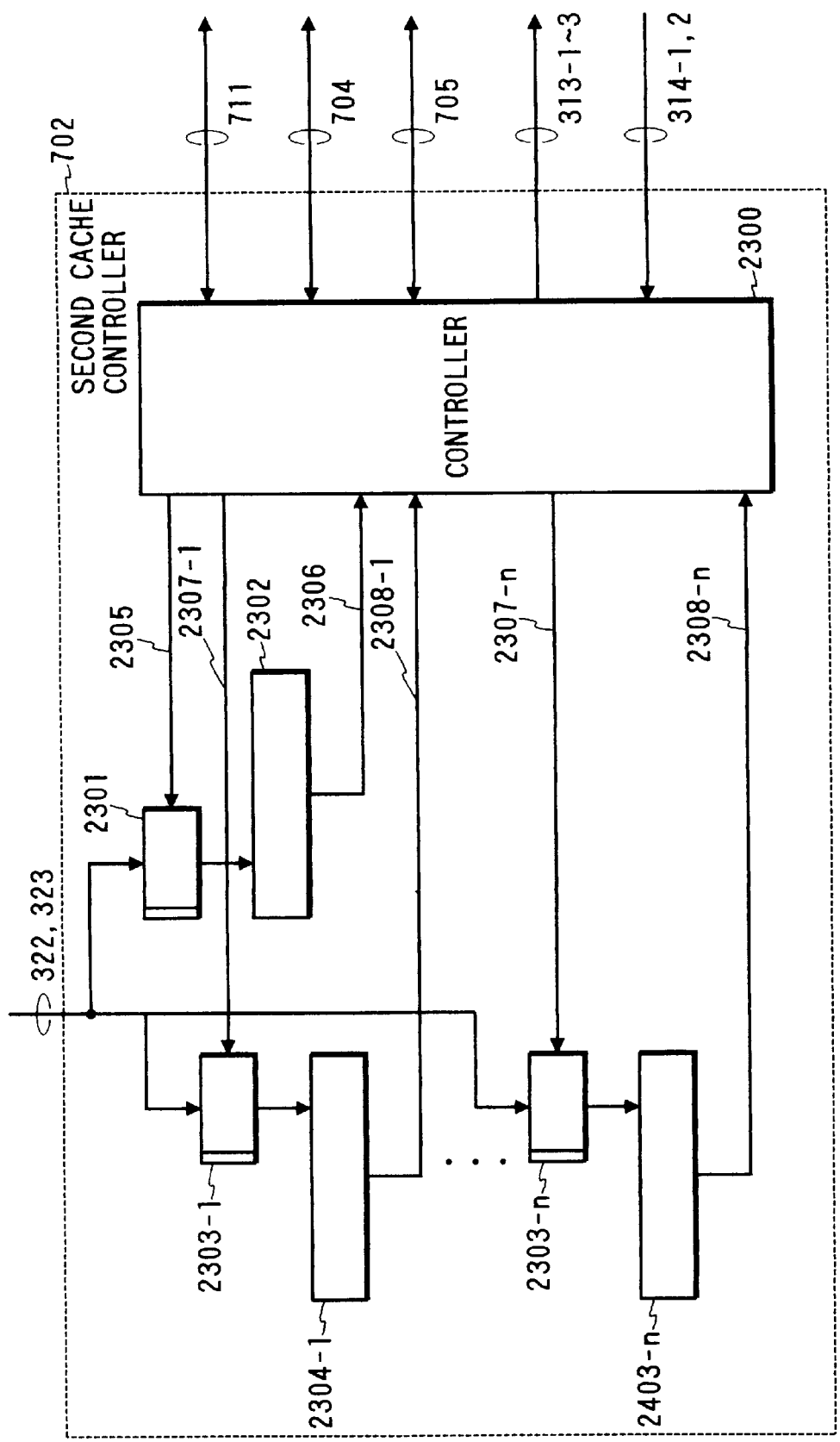
FIG. 10 is a diagram explaining the construction of the first embodiment of the second cache of FIG. 9.

FIG. 10 is a block diagram showing the construction of the first embodiment of the second cache controller 702. The reference character 2300 is a control part for performing the control described in FIG. 11, the reference characters 2301, 2303-1 to 2303-n are registers, and the reference characters 2302, 2304-1 to 2304-n are comparators. The register 2301 holds a line address of the process in the preceding cycle. The registers 2303-1 to 2303-n hold the addresses of the lines under LT from the main memory.

The construction of a second embodiment of the second cache controller 702 will be described, referring to FIG. 12 and FIG. 13. In this embodiment of the construction, when the second cache controller 702 is notified in the BT process by the second cache interface 104 shown in FIG. 3 through the signal 314-1 that the hit signal is 1 (one), the second cache controller 702 instructs the first cache 105 through the interface 711 of FIG. 9 to receive the input data 310-1 to 301-4. On the other hand, when the second cache controller 702 is notified in the BT process by the second cache interface 104 shown in FIG. 3 through the signal 314-1 that the hit signal is 0 (zero), the second cache controller 702 outputs the LT request to the memory controller 701 through the interface 704. Further, when the second cache controller 702 is notified by the second cache interface 104 through the signal 314-2 that the D bit is 1 (one), the second cache controller 702 holds this information, and outputs the read request of this line to the second cache interface 104 just before the LTW process again, and instructs the memory controller 701 to transfer the input data 310-1 to 310-4 to the main memory. Although this re-read process is the same as the BT process when it is seen from the second cache interface 104, especially this process is called as a CO (Copy Out) process to discriminate from the BT process. In the second embodiment of the construction, comparing with the first embodiment of the construction, there is an advantage in that there is no need to keep the W process to the same line address waiting until the data under LT process arrives and the LTW process is issued.

FIG. 13 is a table showing the control algorithm in the construction of the second embodiment of the second cache controller 702. Just after the CO process, the LTW process is performed. When an LTW process request exists, an IDLE process is executed if an LTW process or a W process to the same line is issued in the preceding cycle, and a CO process is executed if not. When an LTW process request does not exist but a BT process request exists, an IDLE process is executed if the preceding cycle is an LTW process or a W process to the same line, and a BT process is executed if not. When an LTW process request and a BT process request do not exist but a W process request exists, an IDLE process is executed if the preceding cycle is an LTW process to the same line, and a W process is executed if not.

Figure 12:
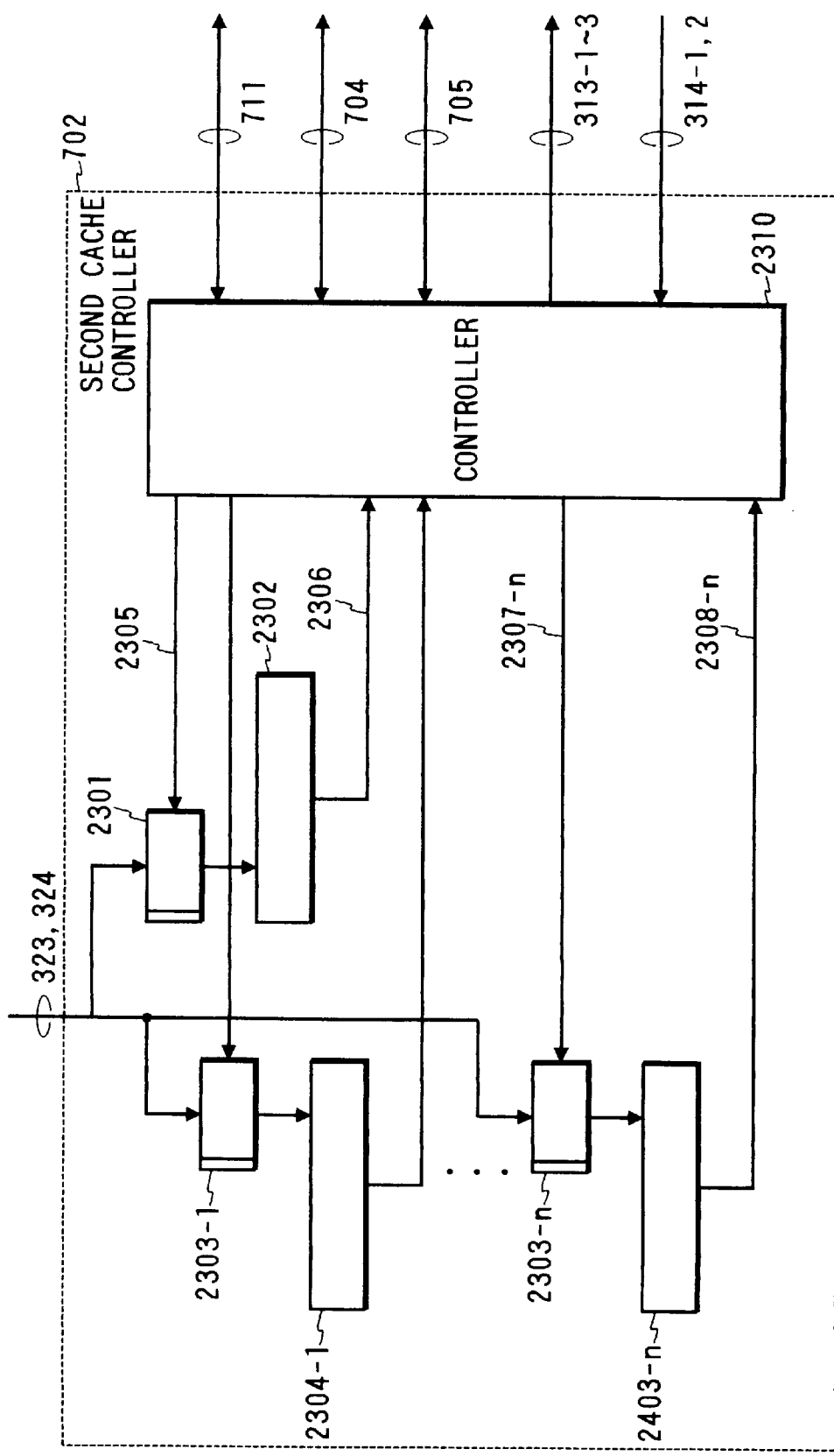
FIG. 12 is a diagram explaining the construction of the second embodiment of the second cache of FIG. 9.

FIG. 12 is a block diagram showing the construction of the second embodiment of the second cache controller 702. The reference character 2310 is a control part for performing the control described in FIG. 13, the reference characters 2301, 2303-1 to 2303-n are registers, and the reference characters 2302, 2304-1 to 2304-n are comparators. The register 2301 holds a line address of the process in the preceding cycle. The registers 2303-1 to 2303-n are the lines under LT process from the main memory, and hold an address of the line expelled from the cache having the D bit of 1 (one).

Figure 14:
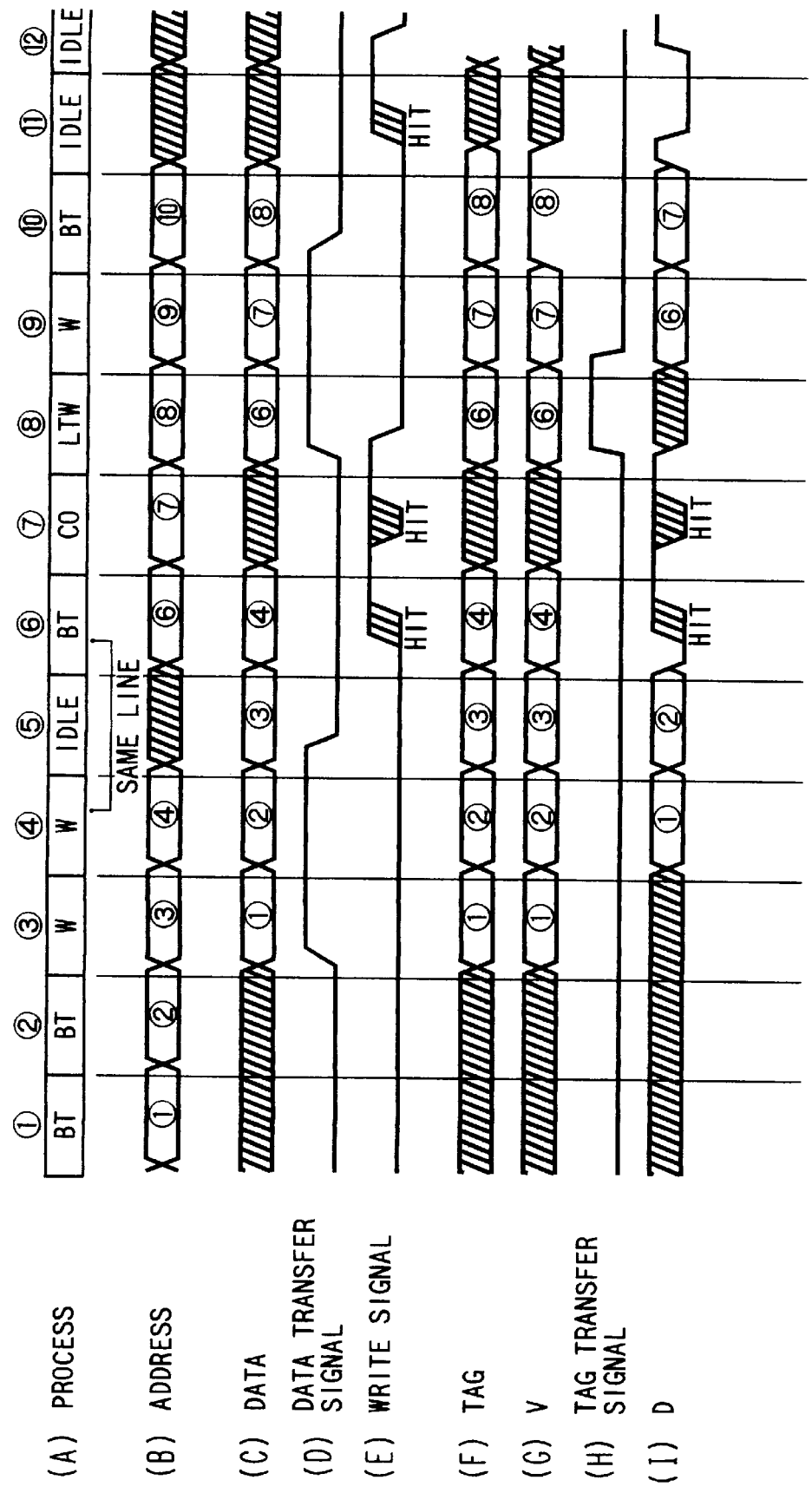
FIG. 14 is a chart explaining the feature of a pipeline process.

FIG. 14 is a chart showing the pipeline process performed by the second cache interface 104 of FIG. 3. It is assumed that the W processes in the third, the fourth and ninth are hit, and the W process in the fourth and the BT process in the sixth are performed to the same line. It can be understood that each of the precesses is performed in one cycle pitch.

Figure 15:
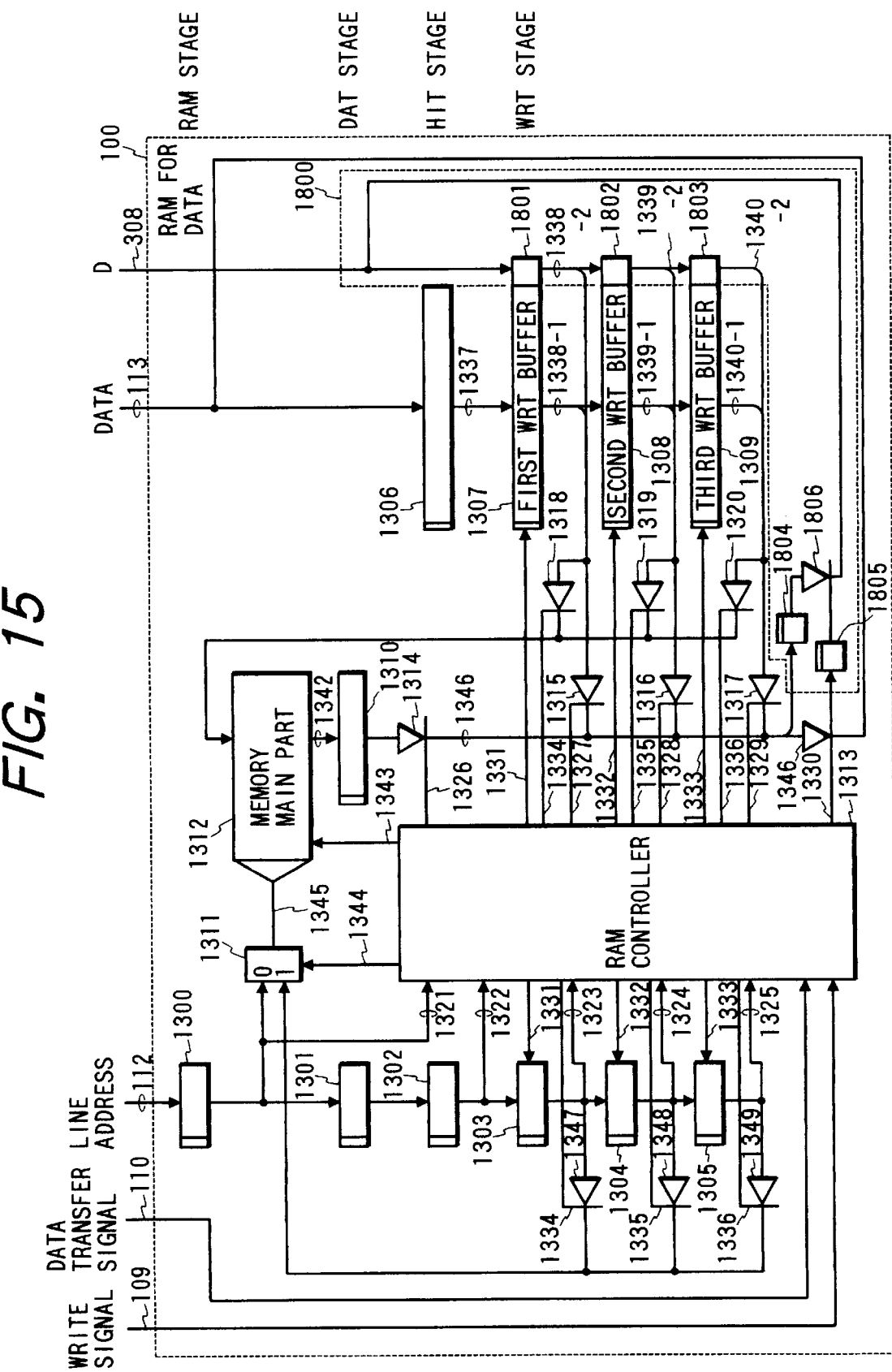
FIG. 15 is a diagram explaining the construction of the first embodiment of the data RAM 100 of FIG. 3.

FIG. 15 is a diagram showing the construction of an embodiment of a data RAM 100 of FIG. 3. The reference character 1312 is a memory main part, the reference character 1313 is a RAM controller, the reference character 1311 is a two-input selector, the reference characters 1300 to 1309, 1801 to 1805 are registers, and the reference characters 1314 to 1320, 1806, 1347 to 1349 are tri-state buffers. The reference characters 1300, 1301, 1302 are registers for holding line addresses of the RAM stage, the DAT stage and the HIT stage, respectively. The reference characters 1303, 1307, 1801 are the address part, the data part and the D bit of a first WRT buffer, respectively. Similarly, the reference characters 1304, 1308 and 1802 are the address part, the data part and the D bit of a second WRT buffer respectively, and the reference characters 1305, 1309 and 1803 are the address part, the data part and the D bit of a third WRT buffer respectively. The tri-state buffer 1316, 1319, 1320 are write bypasses for writing data and a D bit in the first WRT buffer, the second WRT buffer and the third WRT buffer to the memory maim part 1312, respectively. Corresponding to the writing, the tri-state buffers 1347 to 1349 select addresses. The reference character 1314 is a tri-state buffer for being operated at starting to read the memory main part 1312. The tri-state buffers 1315, 1316, 1317 are read bypasses for being opened at starting to read the data parts and the D bit of the first WRT buffer, the second WRT buffer and the third WRT buffer respectively. The reference character 1346 is a tri-state buffer for sending dead-out data to the bus 113, and the reference character 1806 is a tri-state buffer for sending a read-out D bit to the bus 308. The reference character 1301 is a register of the DAT stage for holding the read-out data from the memory main part 1312, and the reference character 1306 is a register of the HIT state for holding the transferred data through the bus 113. The reference characters 1804, 1805 are, as described with referring to FIG. 4 to FIG. 6, registers for delaying the output of D bit from the data by one cycle. Similarly, the D bit 308 is not received by the register of the HIT stage but directly received by the first WRT buffer since the output of D bit delays from the data by one cycle.

Control of the RAM controller 1313 will be described below. The RAM controller 1313 outputs a first WRT buffer set signal 1331 to the first WRT buffers 1303, 1307, 1801, a second WRT buffer set signal 1332 to the second WRT buffers 1304, 1308, 1802, and a third WRT buffer set signal 1333 to the third WRT buffers 1305, 1309, 1803. When the set signal becomes "1", input data is written in the buffer. The RAM controller outputs a first WRT buffer select signal 1334 to the tri-state buffers 1318, 1347 of write bypasses, a second WRT buffer select signal 1335 to the tri-state buffers 1319, 1348 of write bypasses, a third WRT buffer select signal 1336 to the tri-state buffers 1320, 1349 of write bypasses, a first to a third WRT buffer select signals 1326 to 1329 to the tri-state buffers 1315 to 1317 of read bypasses, a RAM output select signal 1326 to the tri-state buffer 1314, an output buffer enable signal 1330 to the tri-state buffer 1346, a RAM write signal 1343 to the memory main part 1312 and an address select signal 1344 to the address selector 1311, referring to the data transfer signal 110, the write signal 109, the output 1321 of the address register 1300 of the RAM stage, the output 1322 of the address register 1302 of the HIT stage, the output 1323 of the first WRT buffer address part 1303, the output 1324 of the second WRT buffer address part 1304 and the output 1325 of the third WRT buffer address part 1305.

Figure 16:
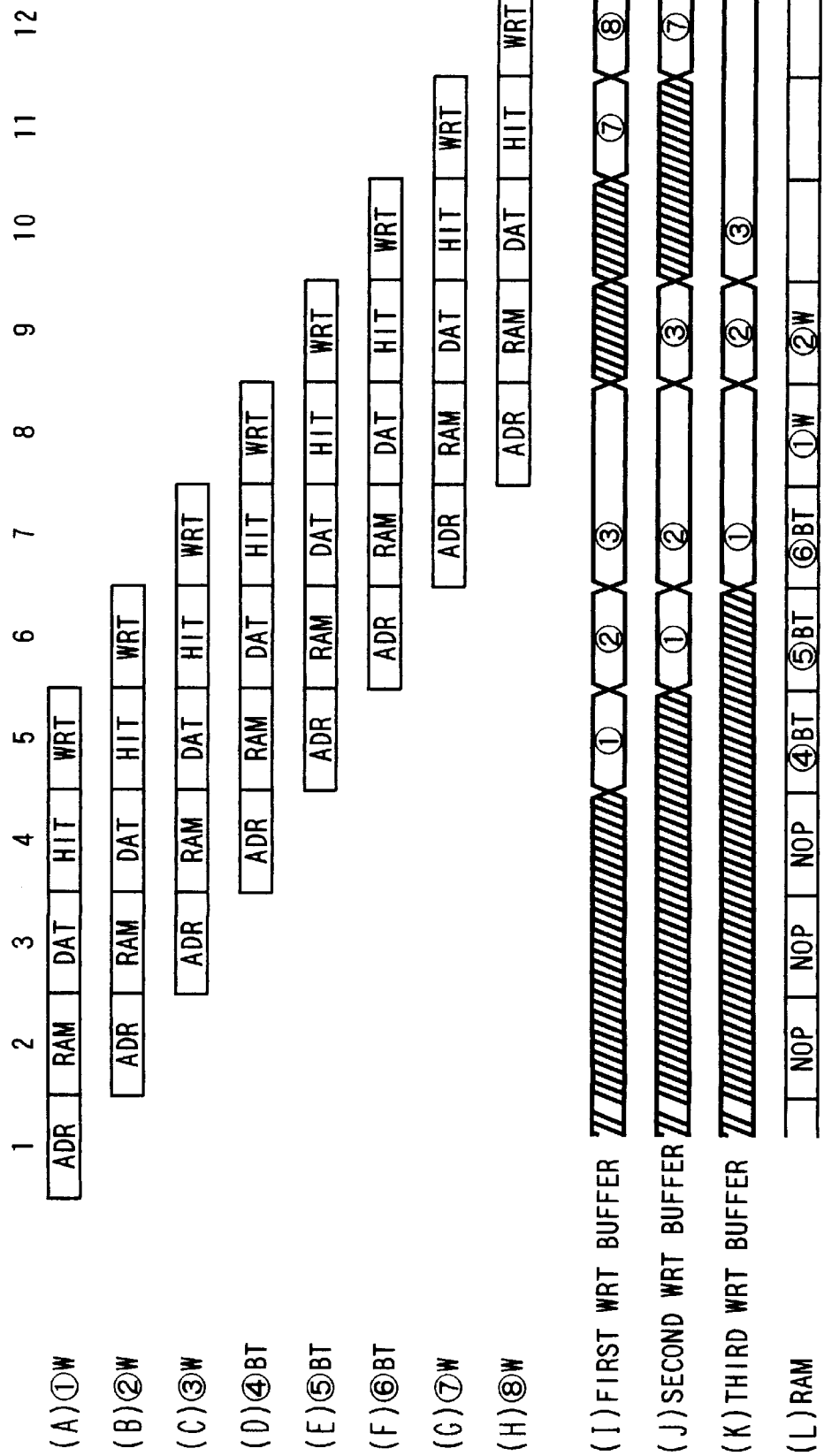
FIG. 16 is a chart explaining the operation of the data RAM 100 of FIG. 3.

If there is an enable entry among the three WRT buffers at a RAM stage of the process which the data transfer signal 110 becomes 1 (one), the RAM controller 1313 sets a buffer select signal corresponding to the oldest WRT buffer and writes its content in the memory main part 1312 by setting a RAM write signal 1343. FIG. 16 shows the operation. It is an example of a case where processes W, W, W, BT, BT, W, W are continued. At the WRT stage (in the fifth cycle) of the first W process, data is written in the first WRT buffer. At the WRT stage (in the sixth cycle) of the second W process, the content of the first WRT buffer is transferred to the second WRT buffer and data of the second W process is written in the first WRT buffer. At the WRT stage (in the seventh cycle) of the third W process, the content of the second WRT buffer is transferred to the third WRT buffer and the content of the first WRT buffer is transferred to the second WRT buffer, and data of the third W process is written in the first WRT buffer. In the following BT process, the data is read out to the RAM at the RAM stage (5–7 cycles). At the RAM stage (in the eighth cycle) of the seventh W process, the oldest data of the third WRT buffer is written in the RAM.

Returning to FIG. 15, if there is an entry to the same address among the three WRT buffer during BT process, the RAM controller 1313 transfers the content of the last written entry among them to the data bus 113 by setting the corresponding select signal. If there is no entry to the same address, the RAM controller 1313 transfers the content of the memory main part 1312 to the data bus 113 by setting the RAM output select signal 1326.

Figure 17:
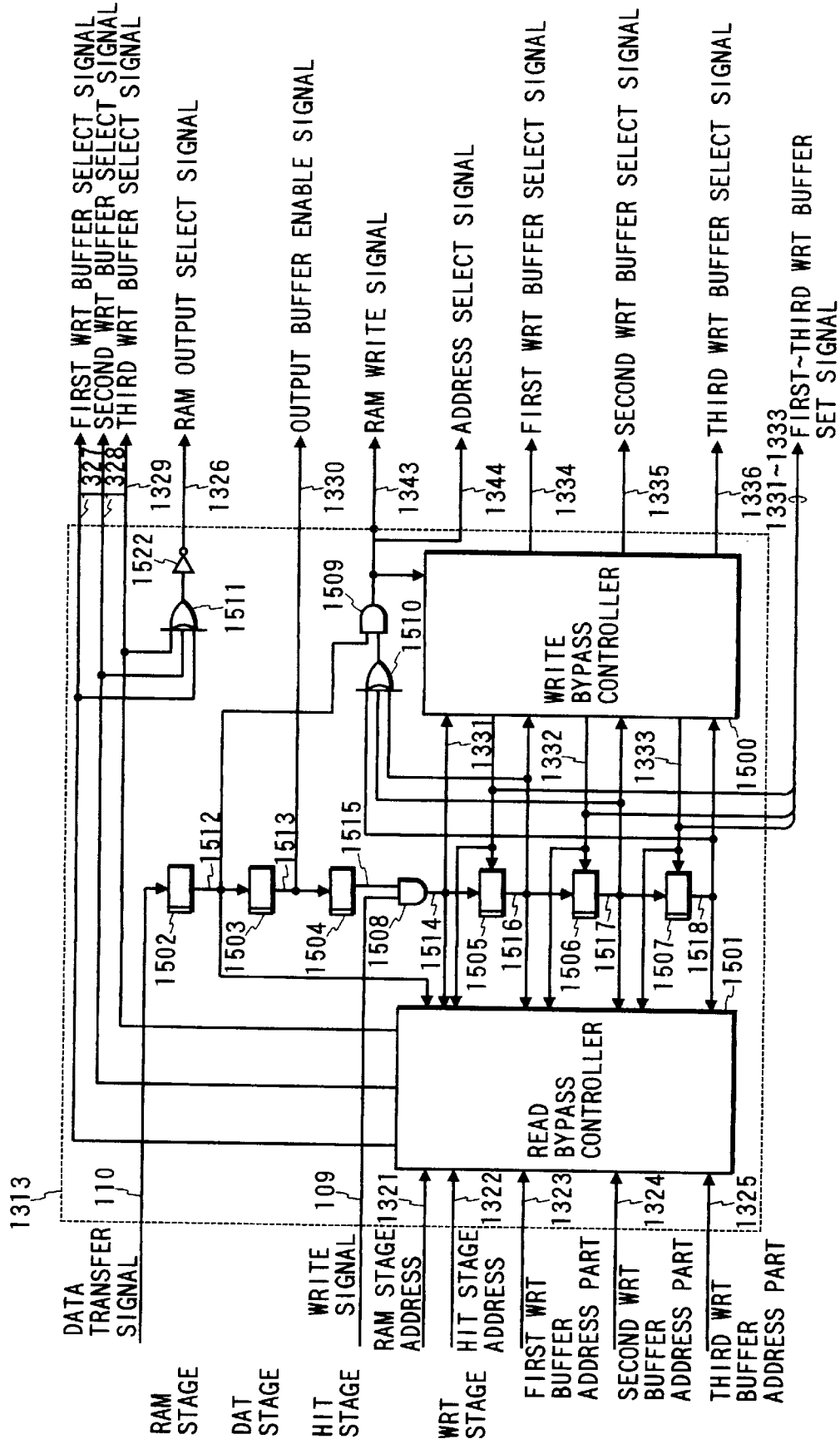
FIG. 17 is a diagram explaining the construction of an embodiment of the RAM controller 1213 of FIG. 15.

FIG. 17 shows the construction of an embodiment of a RAM controller 1313. The reference character 1500 is a write bypass controller, the reference character 1501 is a read bypass controller, the reference characters 1502 to 1507 are registers, the reference characters 1508, 1509 are AND gates, the reference characters 1510, 1511 are OR gates, and the reference character 1522 is an inverter. The registers 1502 to 1504 are registers of RAM, DAT, HIT stages for holding data transfer signals. The output 1514 of the AND gate 1508 is a write determine signal for indicating that the data transfer signal 110 becomes 1 (one) and the write signal 109 to the process also becomes 1 (one). The registers 1505 to 1507 are registers for holding enable signals of the first to the third WRT buffers respectively. The write bypass controller 1500 receives first to third WRT buffer enable signals 1516 to 1518, a RAM write signal 1343 and a write determine signal 1514 as inputs, and outputs first to third WRT buffer set signals 1331 to 1333 and first to third WRT buffer select signals 1334 to 1336. The read bypass controller 1501 receives a RAM stage address 1321, a HIT stage address 1322, signals 1323 to 1325 from the first to the third WRT buffer address parts, the enable signals 1516 to 1518 of the first to the third WRT buffers, the first to third WRT buffer set signals 1331 to 1333, write determine signal 1514 and the data transfer signal 1512 of RAM stage as inputs, and outputs a first to a third WRT buffer select signals 1327 to 1329. When all of the first to the third WRT buffer select signals 1327 to 1329 are 0 (zero), the RAM output select signal 1326 is set to 1 (one). When the data transfer signal 110 becomes 1 (one), the output buffer enable signal 1330 is set to 1 (one) at the DAT stage of the process. When the data transfer signal of the RAM stage is 1 (one) and any one of the first to the third WRT buffer enable signals 1516 to 1518 is 1 (one), the RAM write signal 1343 and the address select signal 1344 are set to 1 (one).

Control of the write bypass controller 1500 will be described below, referring to FIG. 18. The write bypass controller 1500 controls so that the first to the third WRT buffer select signals 1334 to 1336 set a signal corresponding to the oldest WRT buffer to 1 (one) by referring to the enable signals 1516 to 1518 of the first to the third WRT buffers. The aging order is the third WRT buffer, the second WRT buffer, the first WRT buffer. The write bypass controller 1500 controls so that the first to the third WRT buffer set signals 1331 to 1333 set the oldest enable signal of the WRT buffer to 0 (zero) when the RAM write signal 1343 becomes 1 (one) referring to the enable signals 1516 to 1518 of the first to the third WRT buffers, the RAM write signal 1343 and the write determine signal 1514, and set the first WRT buffer set signal 1331 to 1 (one) when the write determine signal 1514 becomes 1 (one).

Figure 19:
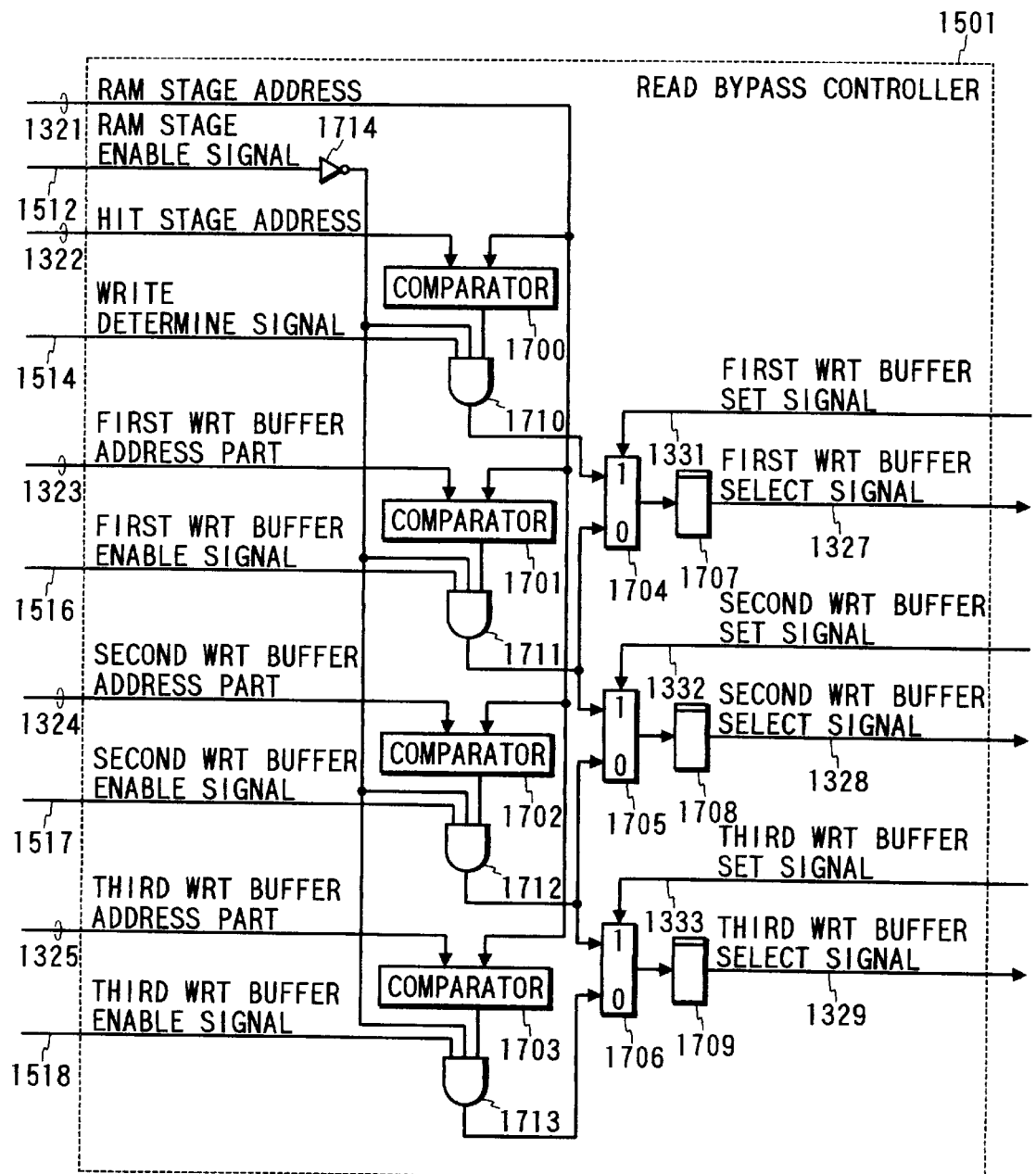
FIG. 19 is a diagram explaining the construction of an embodiment of the read bypass controller 1501 of FIG. 17.

FIG. 19 shows the construction of an embodiment of a read bypass controller 1501. The reference characters 1700 to 1703 are comparators, the reference characters 1704 to 1706 are two-input selectors, the reference characters 1707 to 1709 are registers, the reference characters 1710 to 1713 are AND gates and the reference character 1714 is an inverter.

Figure 20:
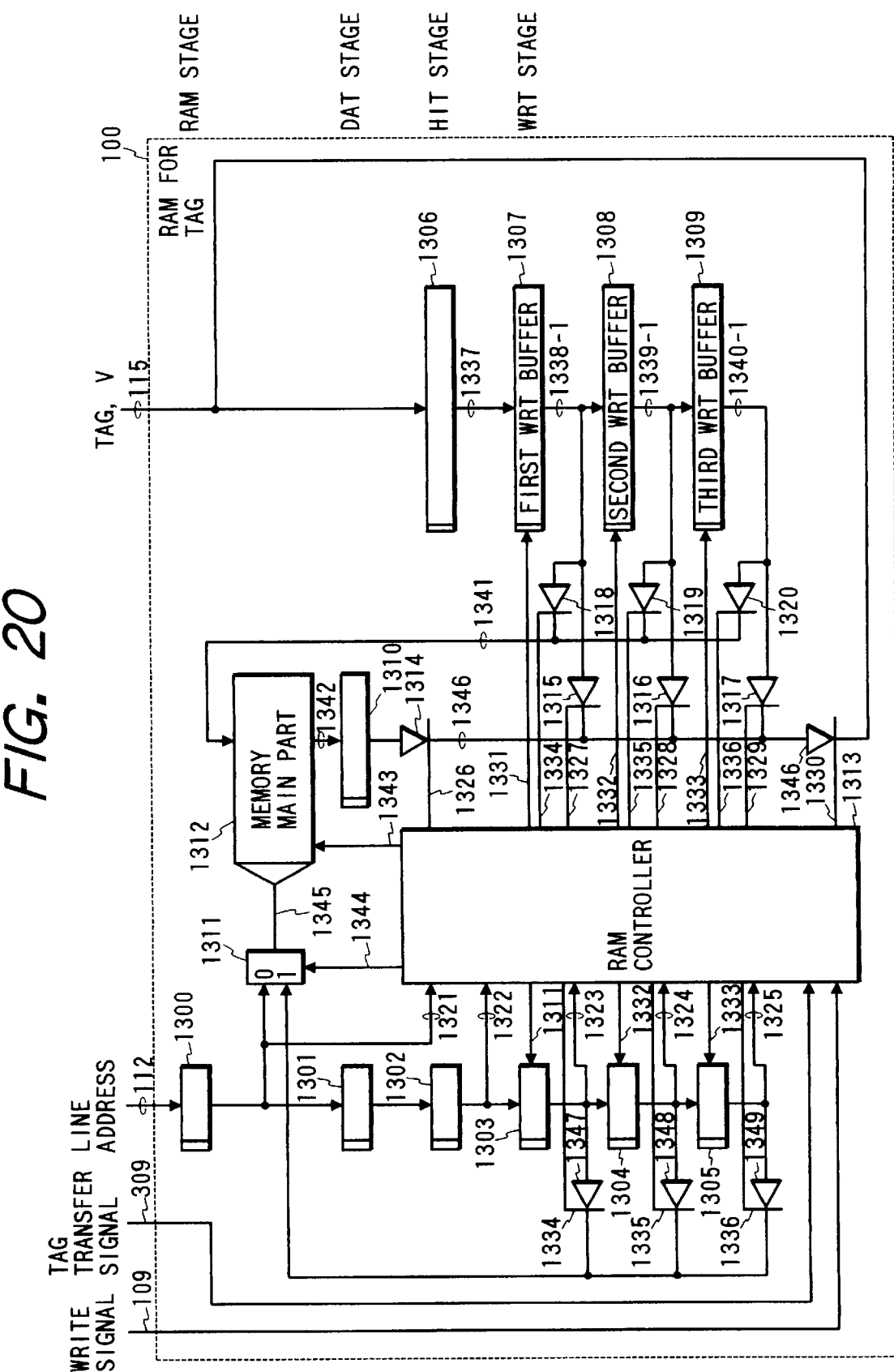
FIG. 20 is a diagram explaining the construction of the first embodiment of the tag RAM 10100 of FIG. 3.

FIG. 20 shows the construction of an embodiment of a tag RAM 101. The different point from the construction of the embodiment of the data RAM 101 in FIG. 15 is that the data RAM 101 does not have a D bit hard 1800. The others are the same, and like parts in this figure are indicated by the same reference characters.

Figure 21:
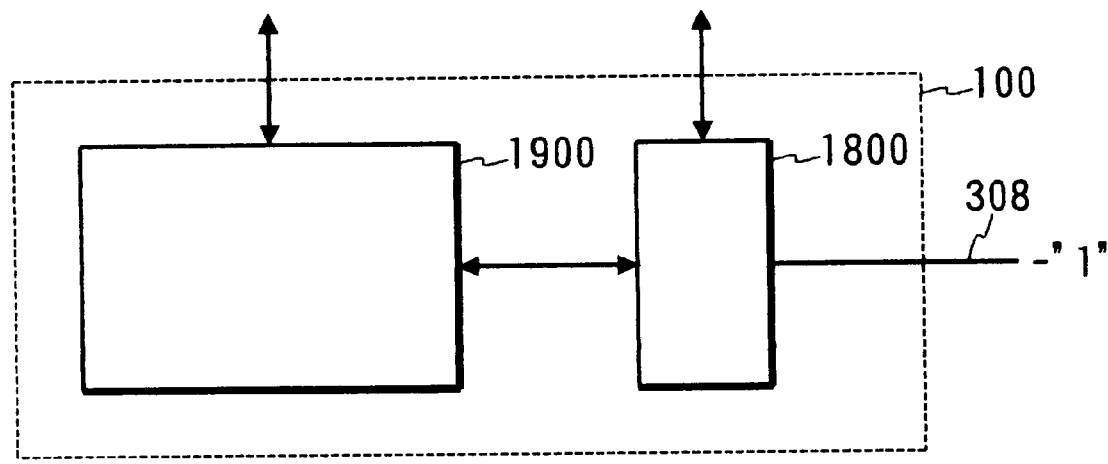
FIG. 21 is a diagram explaining the construction of the second embodiment of the data RAM 100 of FIG. 3.
Figure 22:
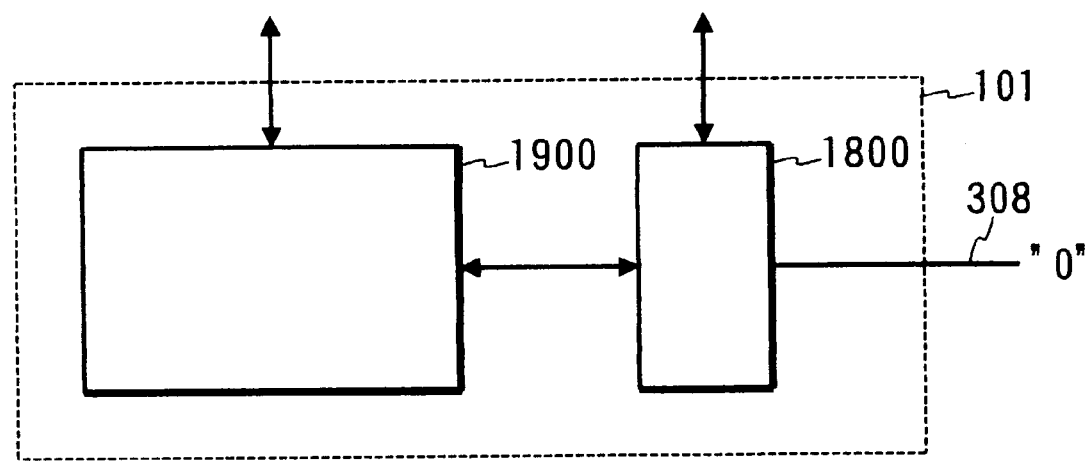
FIG. 22 is a diagram explaining the construction of the second embodiment of the tag RAM 101 of FIG. 3.

FIG. 21 shows the construction of a second embodiment of a data RAM 100, and FIG. 22 shows the construction of a second embodiment of a tag RAM 101. In the both figures, the reference character 1800 is a D bit hard, the reference character 1900 is the other portion of the RAM. The signal 308 is a signal for indicating data which is set to 1 (one) when a data RAM 100 is made and set to 0 (zero) when a tag RAM 101 is made.

Figure 23:
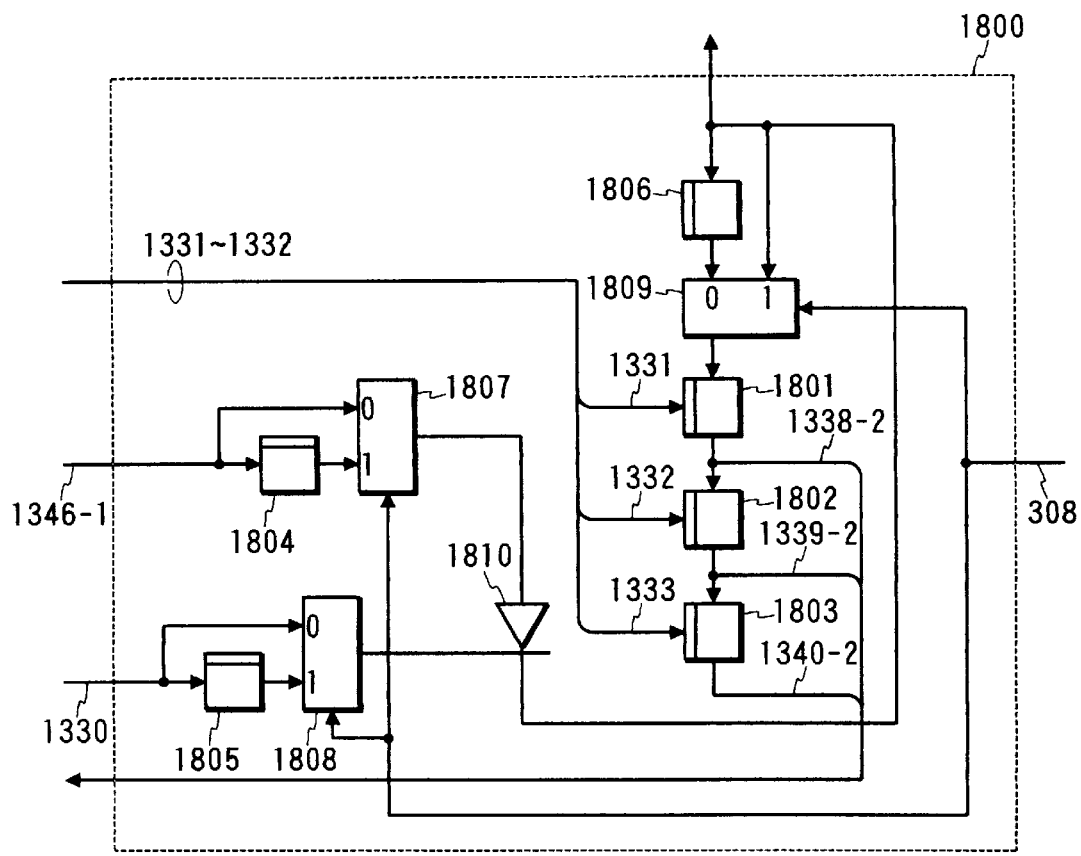
FIG. 23 is a diagram explaining the construction of an embodiment of the D bit hard 1800 of FIG. 21.

FIG. 23 shows the construction of an embodiment of a D bit hard 1800. The reference characters 1801 to 1806 are registers, the reference characters 1807 to 1809 are two-input selectors and the reference character 1810 is a tri-state buffer. When the signal 308 is 1 (one), the registers 1804, 1805 are activated and the register 1806 is inactivated. According to the constructions of the second embodiment of the RAM shown in FIG. 21 to FIG. 23, there is an advantage in that the data RAM and the tag RAM can be realized by a single kind of RAM.

Figure 24:
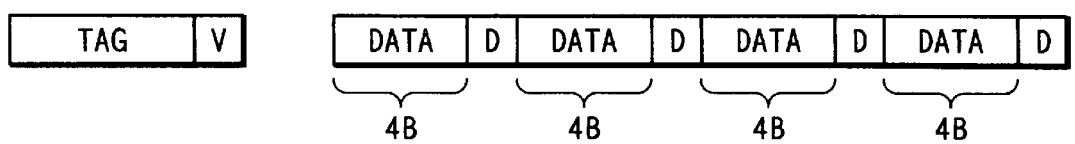
FIG. 24 is a diagram explaining the bit arrangement in a third embodiment of a second cache in accordance with the present invention.

FIG. 24 is a view explaining the bit arrangement of a third embodiment of the second cache in accordance with the present invention. Although the data width dealing with the W process in the second embodiment is solely 16B, it is easy to set the width to 4B by arranging a D bit every 4B as shown in FIG. 24. Therein, the CO process is performed in the BT process if at least one among the four D bits is 1 (one).

On the other hand, it is also easy to increase the line size above 16B. When a line of, for example, 24B is written in the second cache, the LTW process may be performed to four continued 16Bs in a pipeline.

Figure 25:
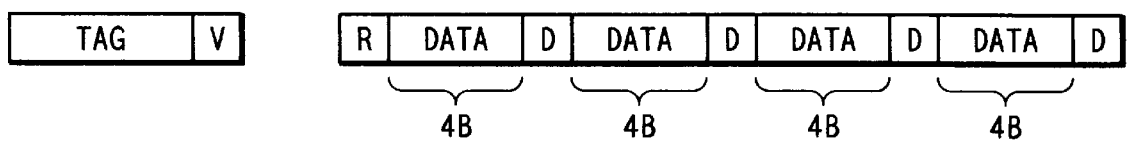
FIG. 25 is a diagram explaining the bit arrangement in a fourth embodiment of a second cache in accordance with the present invention.

FIG. 25 is a view explaining the bit arrangement of a fourth embodiment of the second cache in accordance with the present invention. As to the process to the second cache, there are a purge process in addition to the W, the LTW, the BT processes described in the second embodiment. The process is that if a hit is found in a tag, the line is disabled. In order to pipeline by mixing the process with other processes, an R (Remove) bit may be provided to the data RAM. It is indicated that when the R bit is 1 (one), the line is disable even if the V bit is 1 (one). In the purge process, a tag is read as the same in the W process and the R bit is written instead of the V bit.

Figure 26:
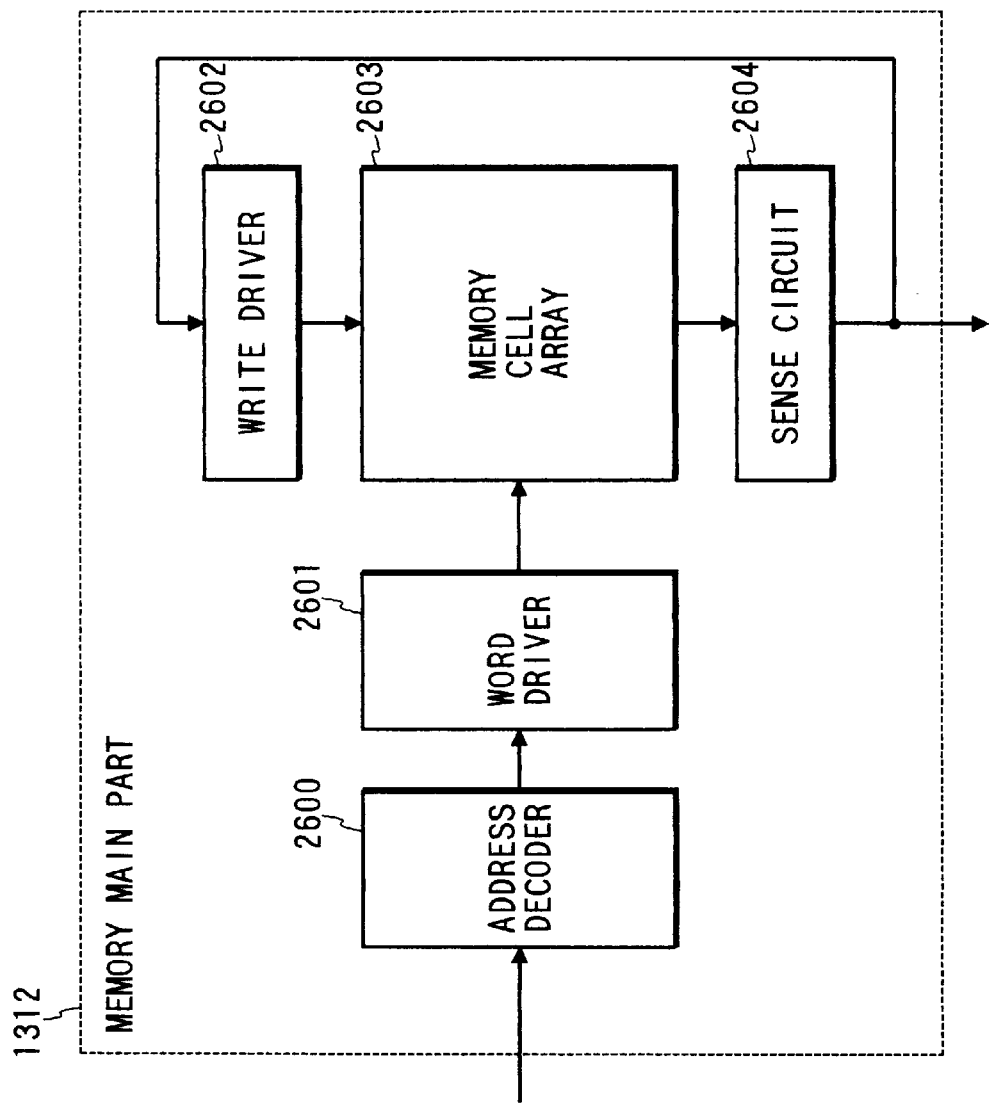
FIG. 26 is a diagram explaining the construction of an embodiment of the memory main part 1312 of FIG. 15.

FIG. 26 shows the construction of an embodiment of a memory main part 1312 of FIG. 15. The reference character 2600 is an address decoder, the reference character 2601 is a word driver, the reference character 2602 is a write driver, the reference character 2603 is a memory array and the reference character 2604 is a sense circuit.

Figure 27:
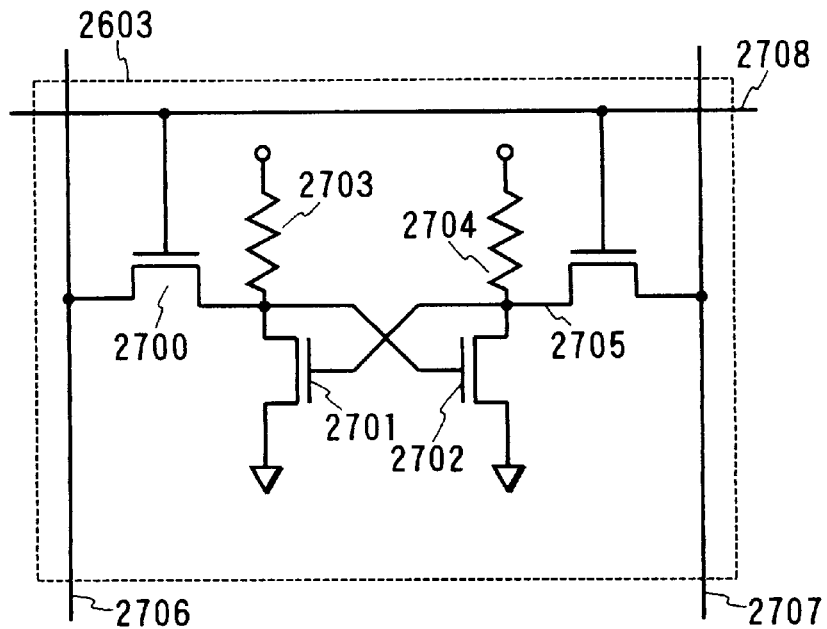
FIG. 27 is a diagram explaining the construction of the first embodiment of the memory cell array 2603 of FIG. 26.

FIG. 27 shows the construction of a first embodiment of the memory cell 2603 of FIG. 26. The reference characters 2700 to 2702, 2705 are NMOS transistors, and the reference characters 2703 and 2704 are resistive elements. The reference characters 2706 and 2707 are data wires, and the reference character 2708 is a word wire.

Figure 28:
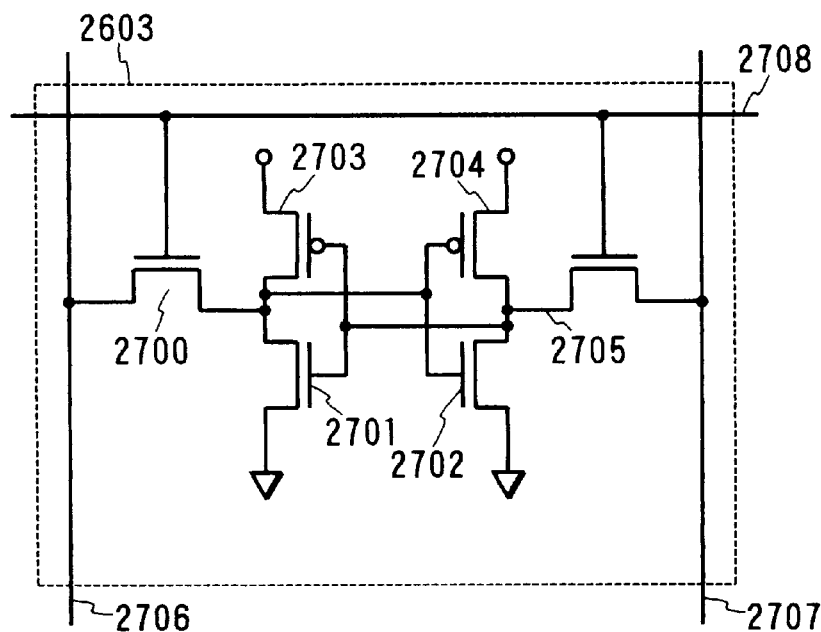
FIG. 28 is a diagram explaining the construction of the second embodiment of the memory cell array 2603 of FIG. 26.

FIG. 28 shows the construction of a second embodiment of the memory cell 2603 of FIG. 26. The reference characters 2700 to 2702, 2705 are NMOS transistors, and the reference characters 2703 and 2704 are PMOS transistors. The reference characters 2706 and 2707 are data wires, and the reference character 2708 is a word wire.

Figure 29:
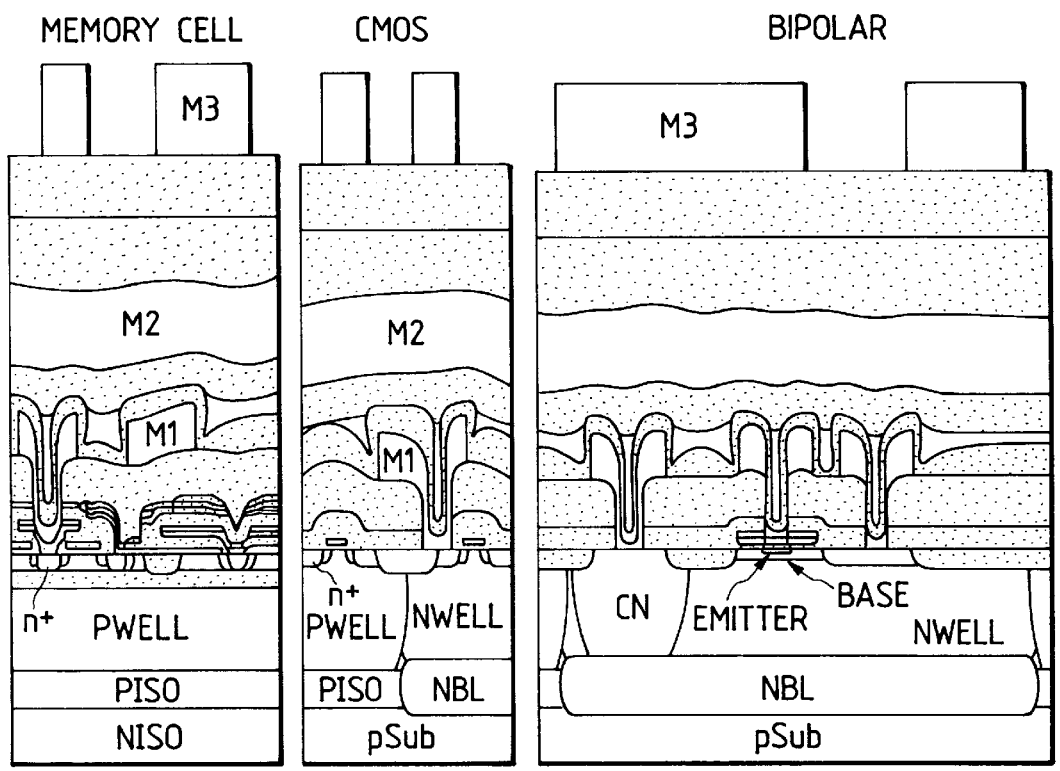
FIG. 29 is a view explaining the cross sections of the RAMs 100 and 101 of FIG. 1.

FIG. 29 is a cross-sectional view of a semiconductor element forming the RAM 100 of FIG. 1. The semiconductor element is manufactured using a Si substrate through BiCMOS process. A high resistivity poli-Si layer is employed in the memory cell. A NISO layer is embedded in the lower portion of the memory cell in order to avoid operational error due to minority carrier injection. By this design, the memory cell has a reliability equal to a memory cell formed in a processor and its cell area can be reduced several times as small as that of the memory cell formed in the processor. On the other hand, the register according to the present invention is formed using a bipolar transistor and a CMOS transistor produced in such a manner as to be shown in the positions indicated by "BIPOLAR" and "CMOS" in FIG. 29.

Figure 30:
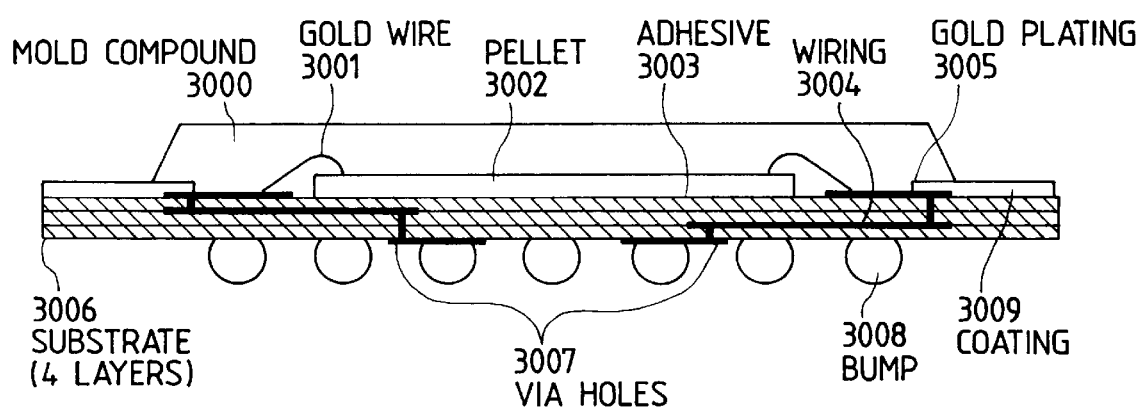
FIG. 30 is a view explaining the construction of an embodiment of package mountings of the RAMs 100 and 101 of FIG. 1.

FIG. 30 is a view showing the feature mounting the semiconductor element forming the RAM 100 of FIG. 1 in a package. The reference character 300 is a mold, the reference character 3001 is a gold wire, the reference character 3002 is a pellet, the reference character 3004 is a wiring, the reference character 3005 is a pad, the reference character 3006 is a substrate, the reference character 3007 is a via hole, the reference character 3008 is a solder ball, and the reference character 3009 is a coating.

FIG. 31 shows a module in which eight of the packages mounting the semiconductor element forming the RAM 100 of FIG. 1 are mounted on a print board. Four of the packages are mounted on each side of the top and the bottom surface of the print board.

Figure 32:
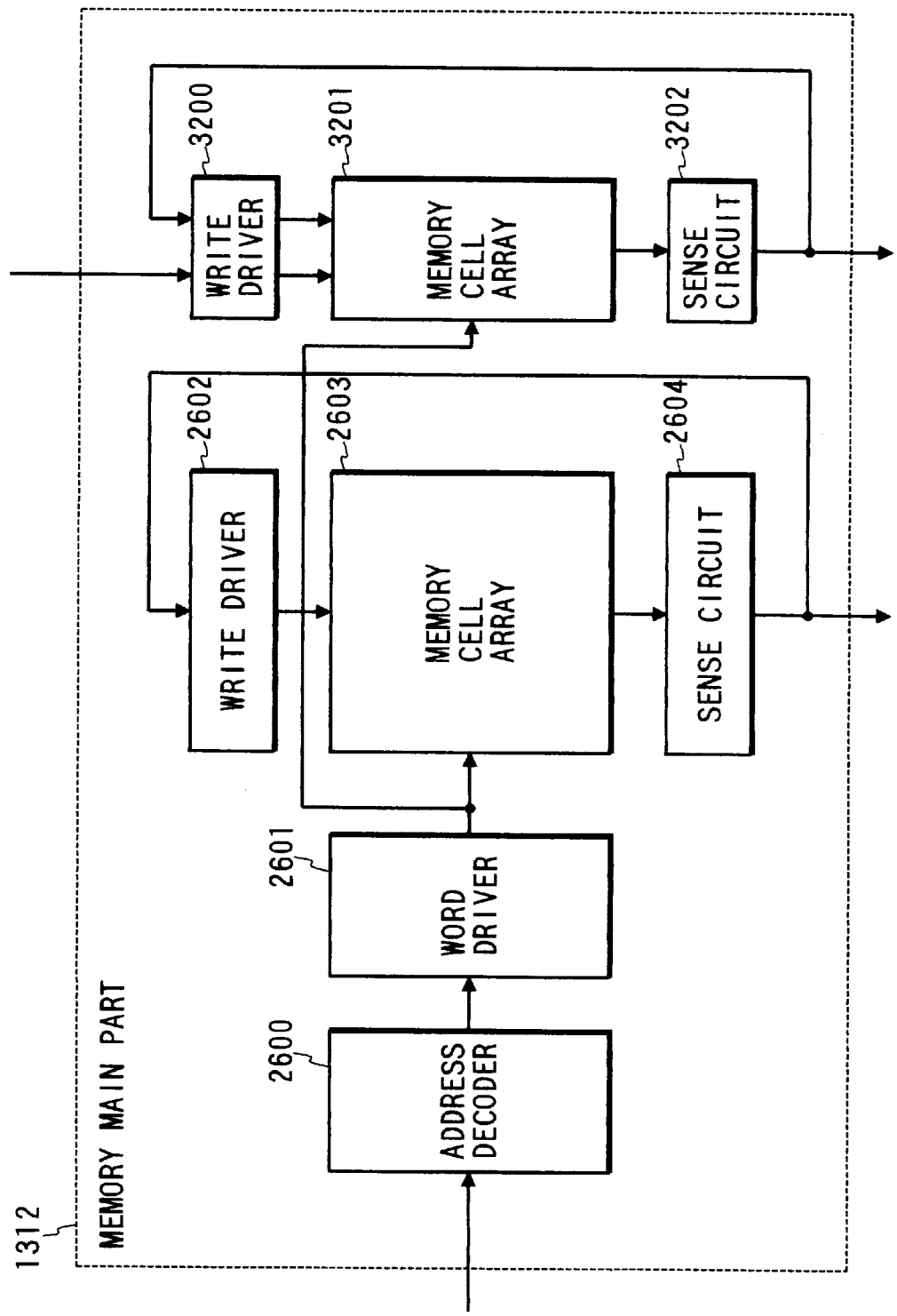
FIG. 32 is a diagram explaining the construction of an embodiment of the memory main part 1312 of FIG. 20.

FIG. 32 shows the construction of an embodiment of the memory main part 1312 of FIG. 20. The reference character 2600 is an address decoder, the reference character 2601 is a word driver, the reference character 2602 is a write driver, the reference character 2603 is a memory cell array, and the reference character 2604 is a sense circuit. The reference character 3201 is a V bit memory cell array, the reference character 3200 is a V bit write driver, and the reference character 3202 is a V bit sense circuit. The write driver 3200 has a common function to write in a specified address and a function to set all the memory cells in the V bit memory cell array 3201 to 0 (zero) at a time.

Figure 33:
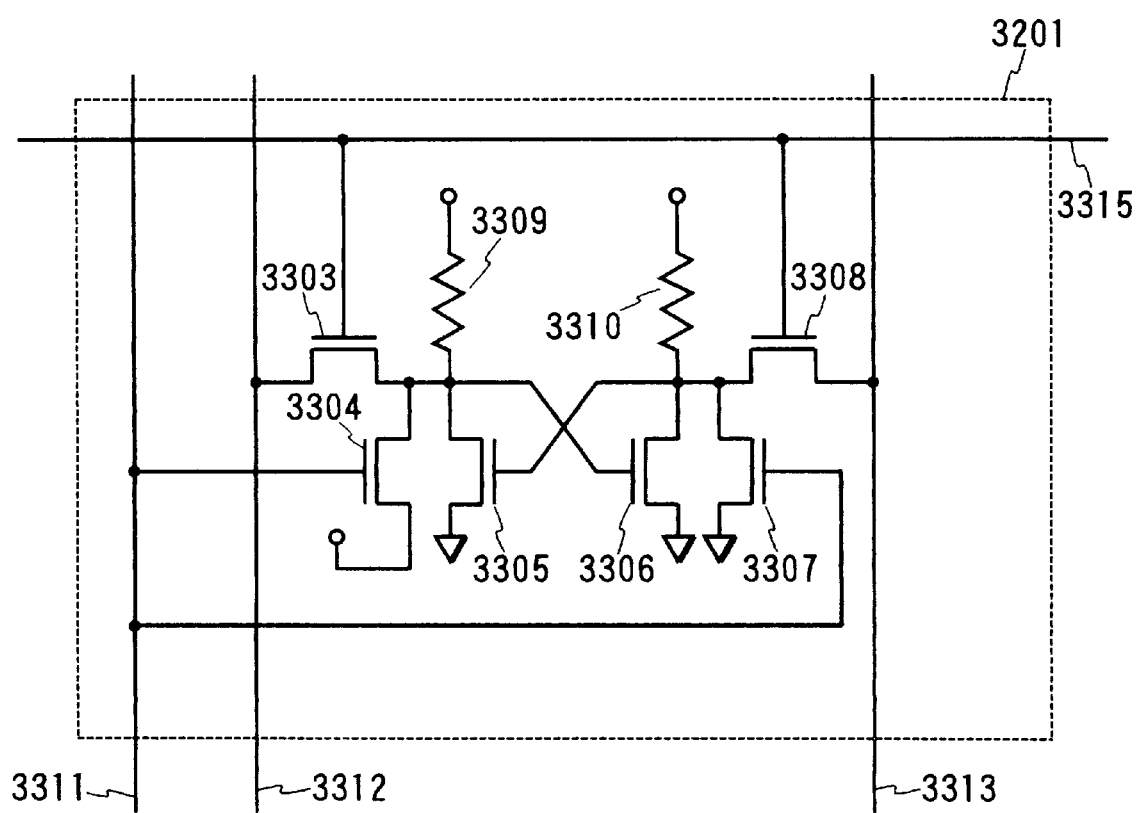
FIG. 33 is a diagram explaining the construction of the first embodiment of the memory cell array 3201 of FIG. 32.

FIG. 33 shows the construction of a first embodiment of the memory cell 3201 in the V bit memory cell array of FIG. 32. The reference characters 3303 to 3308 are NMOS transistors, and the reference characters 3309 and 3310 are resistive elements. The reference characters 3312 and 3313 are data wires, and the reference character 3315 is a word wire. The reference character 3311 is a V bit reset wire. The V bit reset wire is connected to all of the V bit cell, and it is possible to disable the all of the V bit lines to 0 (zero) at a time by setting the V bit reset wire to high state by the write driver 3200. This function has an effect in performing process at a high speed such as initialization of the cache at system resetting and disabling process of the cache at switching process.

Figure 34:
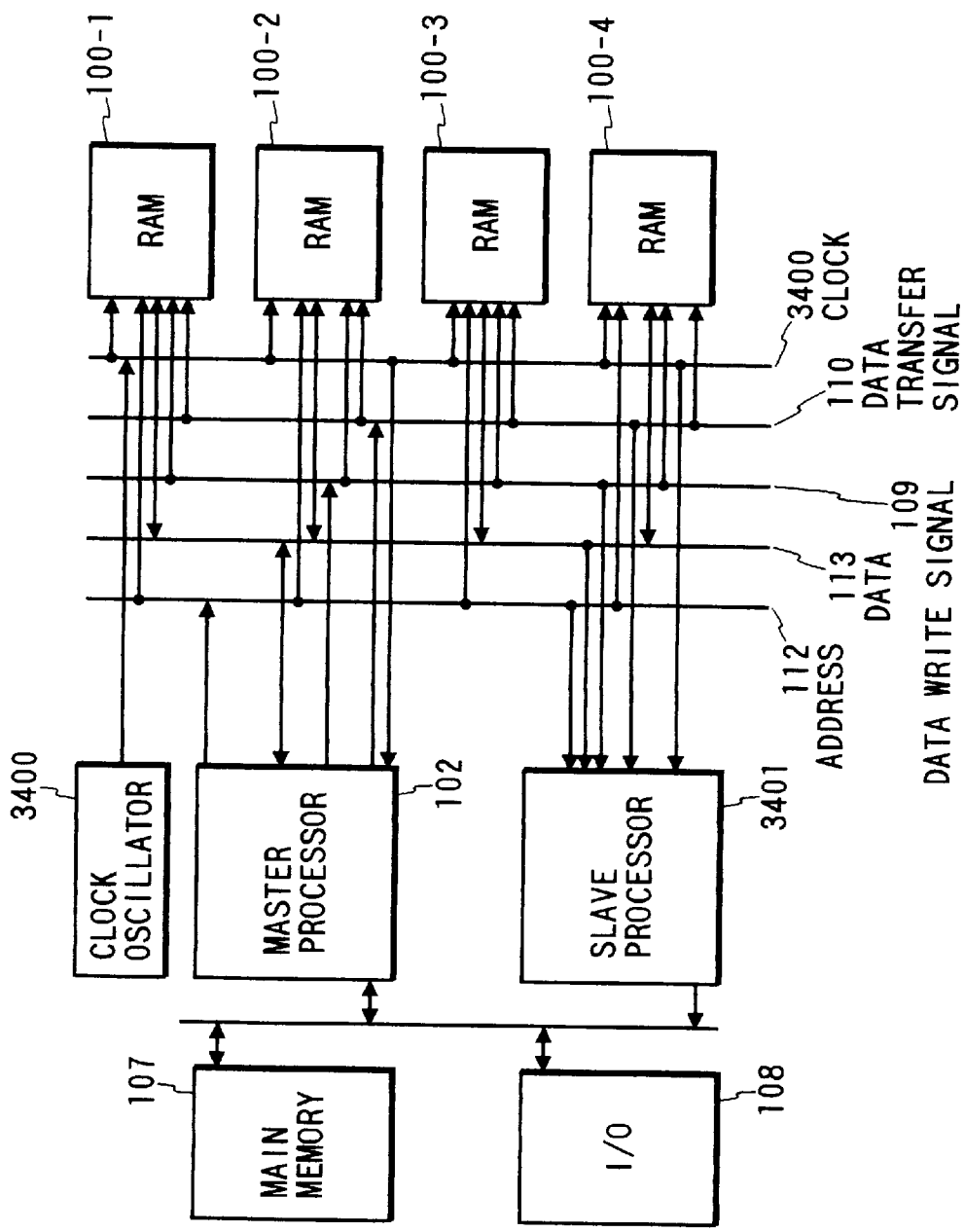
FIG. 34 is an overall diagram of a fifth embodiment in accordance with the present invention.

FIG. 34 is a diagram explaining a fifth embodiment in accordance with the present invention. The same parts in this figure as in FIG. 1 are identified by the same reference characters, and the explanation on the like parts will be omitted here. The reference character 102 is a master processor, the reference character 3401 is a slave processor, and the reference character 3400 is a clock oscillator. This embodiment employs a duplex-processor system in order to improve the reliability. The slave processor 3401 performs the same operation as the master processor 102 in synchronism to the master processor. However, the slave processor 3401 does not output the same signals as the master processor do but receives the signals output from the master processor 102 to compare them with the signals in itself. If there is a discrepancy, the slave processor notifies that to the master processor 102. The clock oscillator 3400 supplies clock to the master processor, the slave processor 3401, and the RAMs 100-1 to 100-4. In the first embodiment of FIG. 1, the clock oscillator 3400 is omitted and not shown. In this construction, data is transferred from the master processor 102 to the slave processor 3401 as well as the RAMs 100-1 to 100-4.

Figure 35:
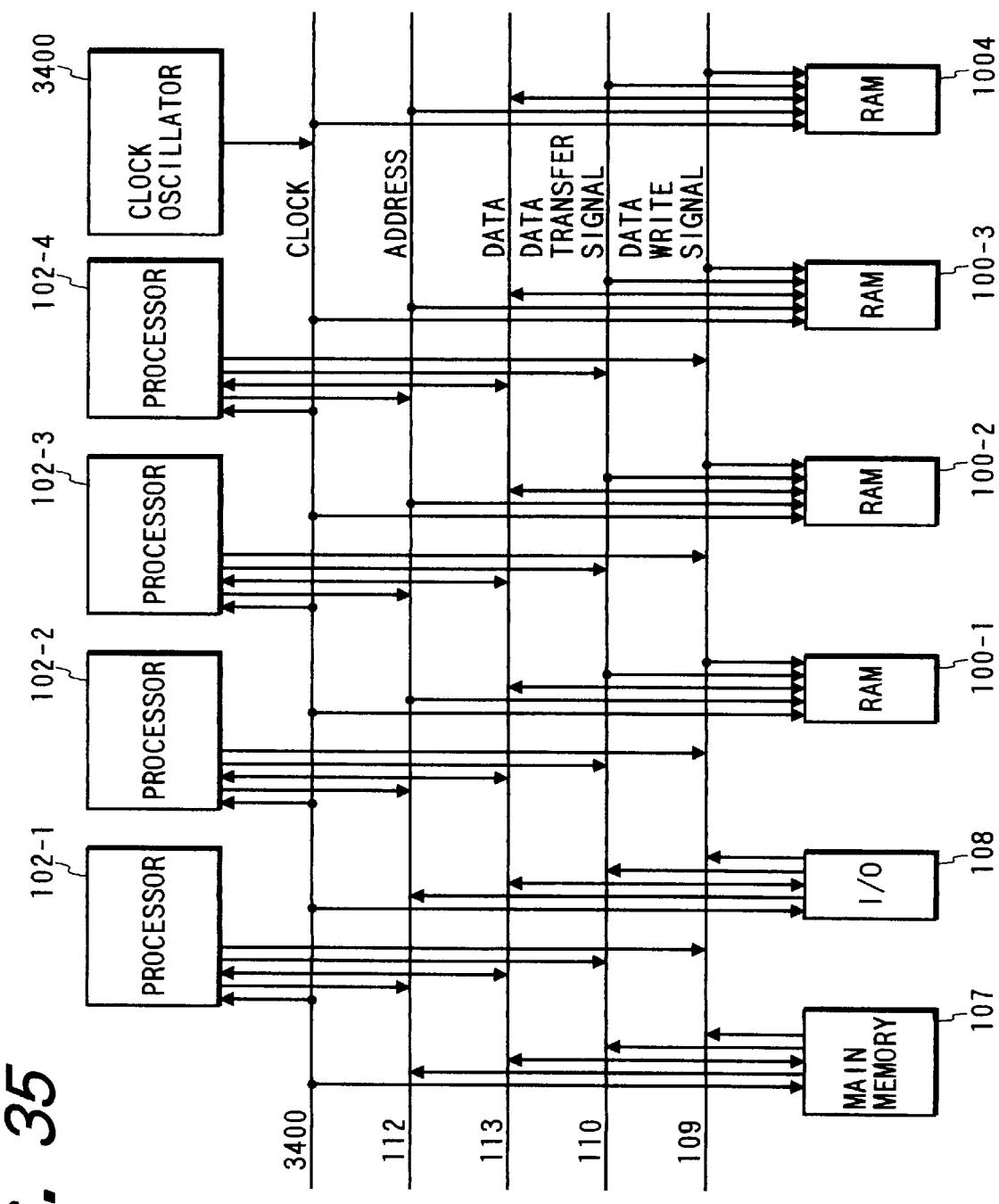
FIG. 35 is an overall diagram of a sixth embodiment in accordance with the present invention.
Figure 36:
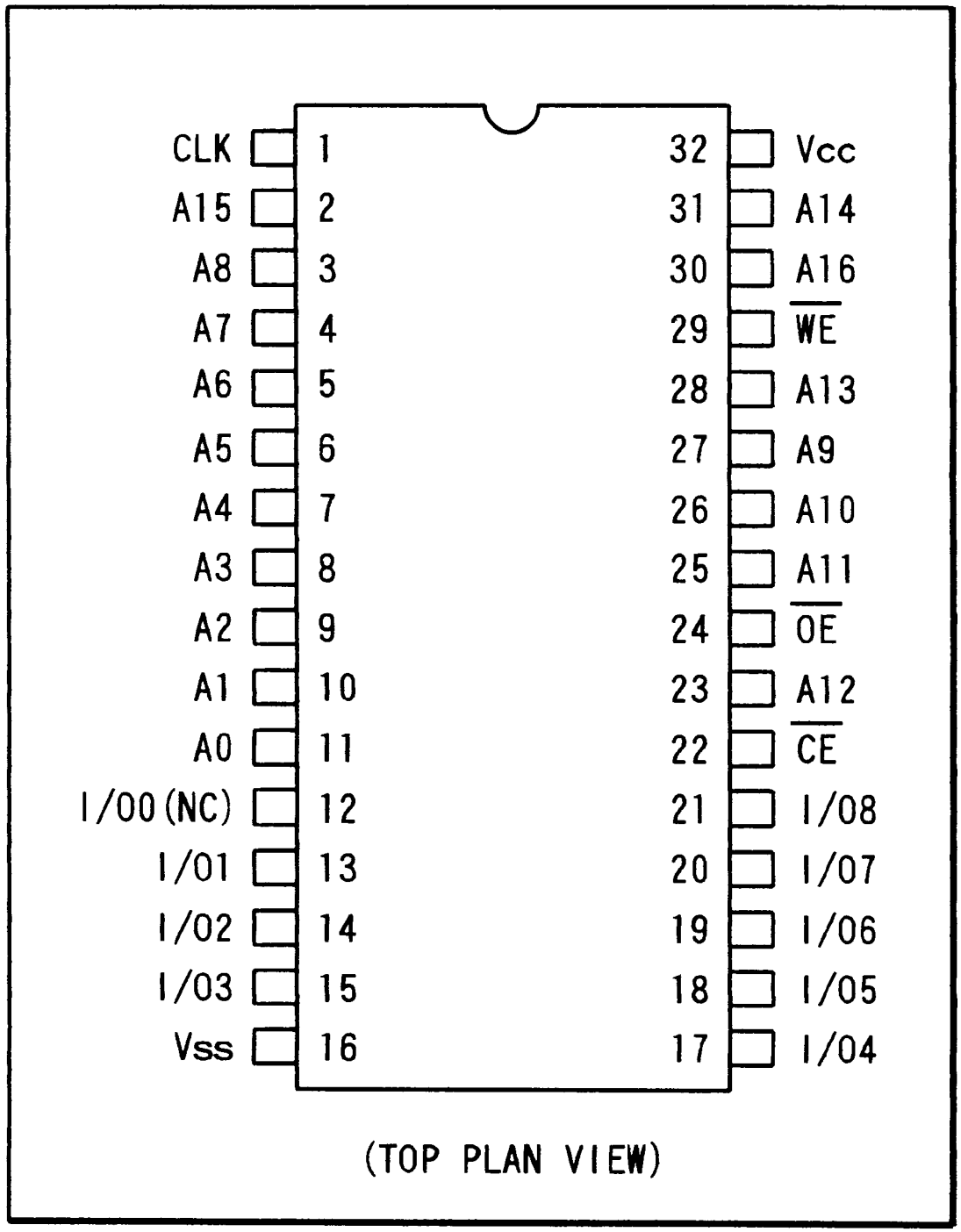
FIG. 36 is a view showing the pin arrangement in an example of a conventional RAM.
Figure 38:
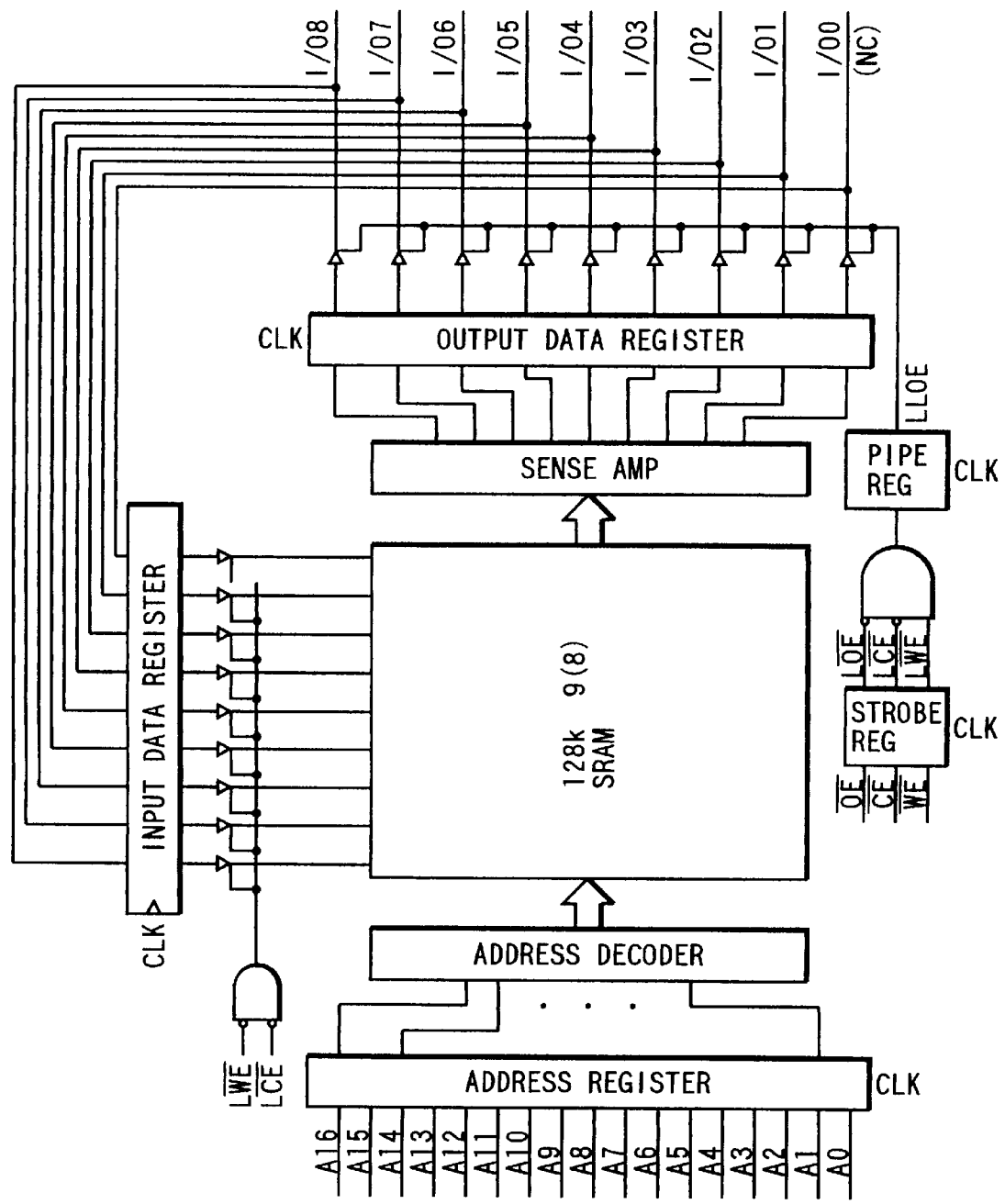
FIG. 38 is an overall block diagram of an example of a conventional RAM.

FIG. 35 is a diagram explaining a sixth embodiment in accordance with the present invention. The same parts in this figure as those in the fifth embodiment of FIG. 34 are identified by the same reference characters, and the explanation on the like parts will be omitted here. The embodiment has four processors 102-1 to 102-4 sharing a second cache, a main memory and an I/O. In such a construction of processor, when plural processors request to access the RAM at the same time, the priority is determined by an arbitration circuit to access sequentially. The present invention is effective in this construction.

According to the present invention, the throughput of the cache RAM can be improved and the performance of an information processor employing the cache RAM can be improved.

We claim:

1. An information processor, comprising:

a main memory for storing data;

a data memory having a plurality of buffers for temporarily holding data and for storing a part of data stored in said main memory;

a tag memory for storing a tag indicating existence of data stored in said data memory; and a processor having a memory interface part for controlling said data memory and said tag memory to transfer data to said buffer before determining whether the data is to be written in said data memory, determining whether the data is written in said data memory according to the content of said tag memory, and writing the data in said data memory after a determination has been made that the data is to be written in said data memory, wherein the data memory, including the plurality of buffers, is located on at least one chip which is separate from the processor, and further wherein said data memory includes a common data line for data write and data read operations to and from said data memory.

2. An information processor according to claim 1, wherein said memory interface part comprises a controller for delivering an address of data to be written and a data transfer signal to said data memory and said address and a tag transfer signal to said tag memory according to a clock signal, and then to deliver the data to said memory after delivering the data transfer signal.

3. An information processor according to claim 2, wherein said controller comprises means for delivering said address of data to be written, said data transfer signal and said tag transfer signal to said memory at the same timing.

4. An information processor according to claim 2, wherein said controller comprises data writing determining means for determining whether the data temporarily held in said buffer is to be written in said memory.

5. An information processor according to claim 4, wherein said data writing determining means comprises means for delivering to said memory a writing signal for instructing the determined result on whether the data temporarily held in said buffer is to be written in said memory.

6. An information processor according to claim 4, wherein said plurality of buffers comprise a plurality of write buffers, said data temporarily held in said buffers being registered in said write buffers according to said write signal from said data writing determining means.

7. An information processor according to claim 1, wherein said data memory comprises a dirty bit area indicating to hold data different from data in said main memory.

8. An information processor according to claim 7, wherein said memory interface part comprises a controller for delivering an address of data to be written and a data transfer signal to said data memory, and said address and a tag transfer signal to said tag memory according to a clock signal, and then to deliver said data and said write signal according to the content of said tag memory and a dirty bit signal to said data memory after delivering the data transfer signal.

9. An information processor according to claim 2, wherein said memory interface part comprises terminals for delivering said address of data to be written, said data transfer signal and said data to said memory respectively, and a terminal for delivering said tag transfer signal.

* * * * *